United States Patent
Heo et al.

(10) Patent No.: US 10,516,884 B2
(45) Date of Patent: Dec. 24, 2019

(54) METHOD FOR ENCODING/DECODING IMAGE ON BASIS OF POLYGON UNIT AND APPARATUS THEREFOR

(71) Applicant: LG ELECTRONICS INC., Seoul (KR)

(72) Inventors: Jin Heo, Seoul (KR); Eunyong Son, Seoul (KR); Moonmo Koo, Seoul (KR); Sehoon Yea, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 538 days.

(21) Appl. No.: 15/123,930

(22) PCT Filed: Mar. 5, 2015

(86) PCT No.: PCT/KR2015/002134
§ 371 (c)(1),
(2) Date: Sep. 6, 2016

(87) PCT Pub. No.: WO2015/133838
PCT Pub. Date: Sep. 11, 2015

(65) Prior Publication Data
US 2017/0019669 A1    Jan. 19, 2017

Related U.S. Application Data

(60) Provisional application No. 61/948,511, filed on Mar. 5, 2014.

(51) Int. Cl.
| H04N 19/119 | (2014.01) |
| H04N 19/176 | (2014.01) |
| H04N 19/147 | (2014.01) |
| H04N 19/117 | (2014.01) |
| H04N 19/124 | (2014.01) |
| H04N 19/13  | (2014.01) |

(Continued)

(52) U.S. Cl.
CPC ......... *H04N 19/119* (2014.11); *H04N 19/117* (2014.11); *H04N 19/124* (2014.11);
(Continued)

(58) Field of Classification Search
CPC .. H04N 19/119; H04N 19/147; H04N 19/176; H04N 19/96
USPC ...................................... 375/240.13
See application file for complete search history.

(56) References Cited

U.S. PATENT DOCUMENTS 6,167,159 A * 12/2000 Touma ................ G06T 9/001
                                                          345/419
2003/0048955 A1    3/2003 Pardas et al.
(Continued)

FOREIGN PATENT DOCUMENTS

| CN | 1489114 A   | 4/2004 |
| CN | 101742327 A | 6/2010 |

(Continued)

*Primary Examiner* — Jeremiah C Hallenbeck-Huber
(74) *Attorney, Agent, or Firm* — Dentons US LLP

(57) ABSTRACT

The present invention relates to a method for encoding/decoding a still image or a video based on a polygon unit and an apparatus for supporting the same. Particularly, a method for encoding an image based on a polygon unit may include partitioning an input image by a unit of block, determining a position of at least one point within the block, determining a position of at least one point in each side of the block, partitioning the block into at least one polygon unit using a vertex of the block, at least two points among the points determined in the side of the block, and a point determined within the block and coding the input image by a unit of the polygon unit.

7 Claims, 24 Drawing Sheets

(51) Int. Cl.
  *H04N 19/159* (2014.01)
  *H04N 19/513* (2014.01)
  *H04N 19/61* (2014.01)
  *H04N 19/96* (2014.01)
  *H04N 19/70* (2014.01)
  *H04N 19/54* (2014.01)

(52) U.S. Cl.
  CPC ........... *H04N 19/13* (2014.11); *H04N 19/147* (2014.11); *H04N 19/159* (2014.11); *H04N 19/176* (2014.11); *H04N 19/513* (2014.11); *H04N 19/54* (2014.11); *H04N 19/61* (2014.11); *H04N 19/70* (2014.11); *H04N 19/96* (2014.11)

(56) References Cited

U.S. PATENT DOCUMENTS

| | | | |
|---|---|---|---|
| 2004/0081238 | A1 | 4/2004 | Parhy |
| 2010/0086050 | A1 | 4/2010 | Badawy |
| 2010/0208818 | A1* | 8/2010 | Yin ...................... H04N 19/176 375/240.15 |
| 2010/0208827 | A1* | 8/2010 | Divorra Escoda ..... H04N 19/61 375/240.24 |
| 2011/0200111 | A1* | 8/2011 | Chen ...................... H04N 19/52 375/240.16 |
| 2012/0106627 | A1* | 5/2012 | Guo ...................... H04N 19/176 375/240.02 |
| 2013/0266070 | A1* | 10/2013 | Sato ...................... H04N 19/119 375/240.16 |
| 2013/0279586 | A1* | 10/2013 | Sato ...................... H04N 19/513 375/240.16 |
| 2013/0301716 | A1* | 11/2013 | Zheng ................... H04N 19/70 375/240.12 |

FOREIGN PATENT DOCUMENTS

| | | |
|---|---|---|
| CN | 102647597 A | 8/2012 |
| CN | 103339935 A | 10/2013 |
| KR | 20090047506 A | 5/2009 |
| KR | 20130126688 A | 11/2013 |

* cited by examiner

[Fig. 1]
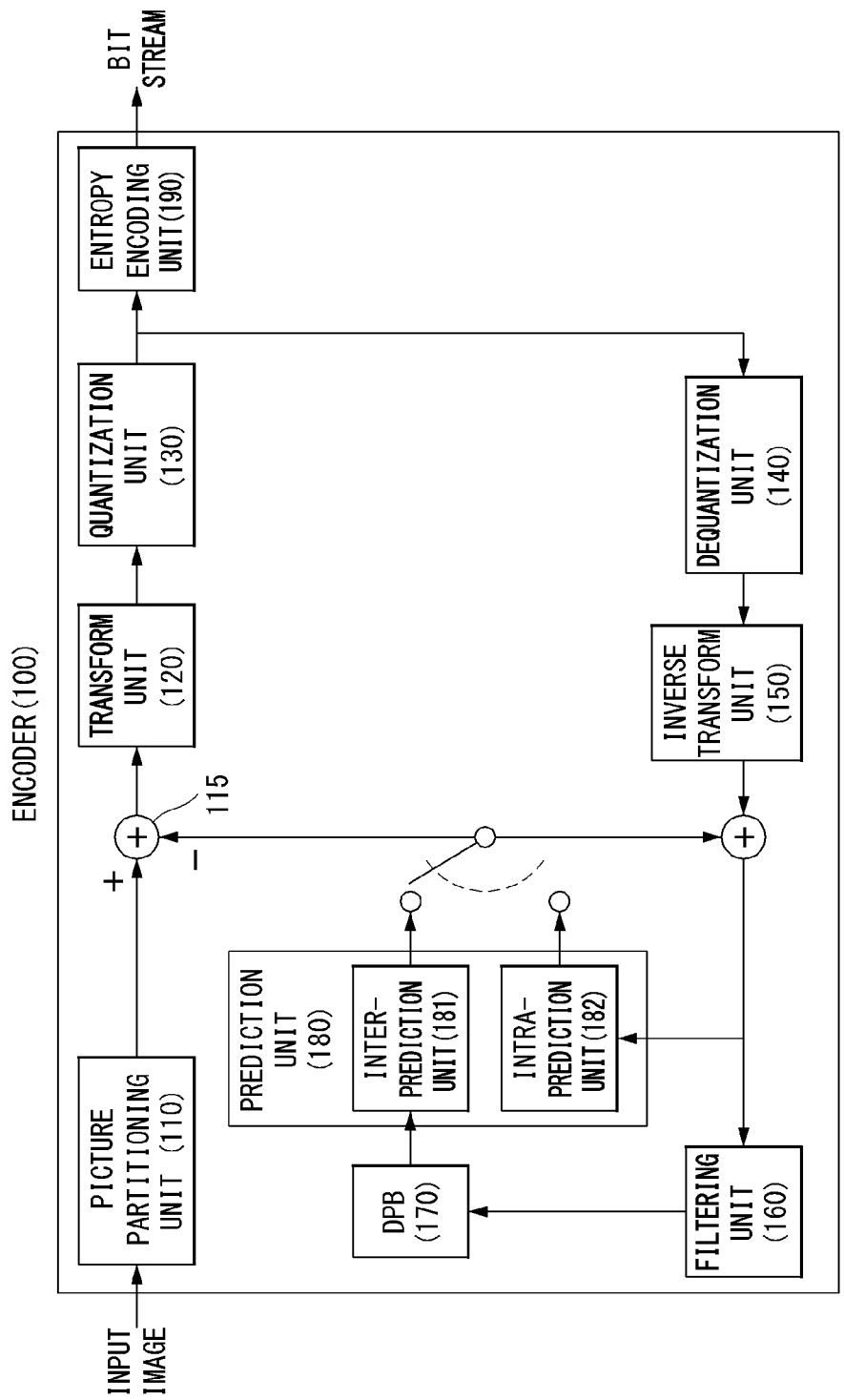

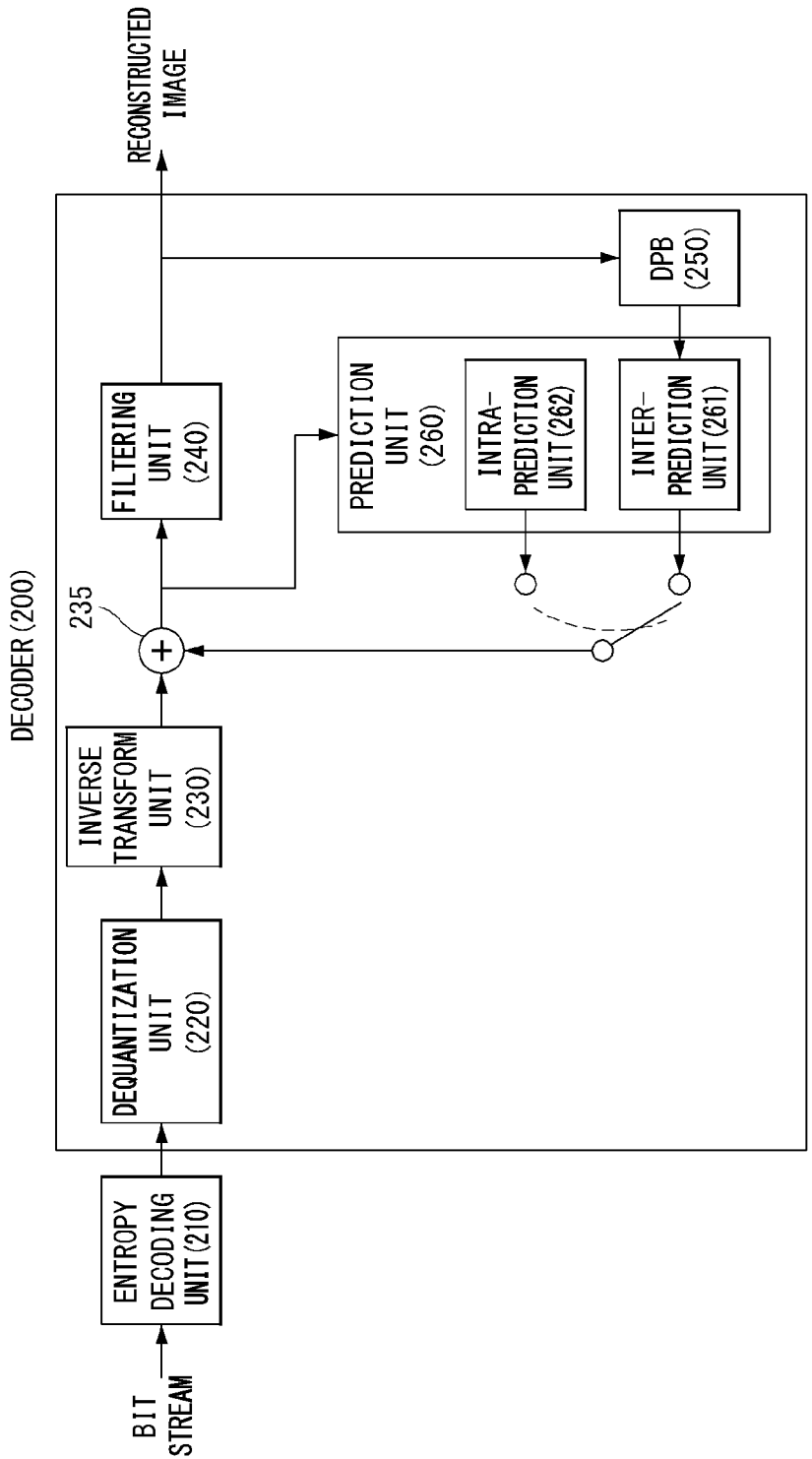
[Fig. 2]

[Fig. 3]
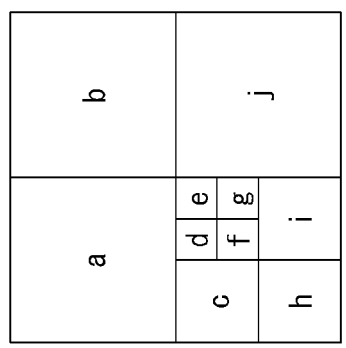
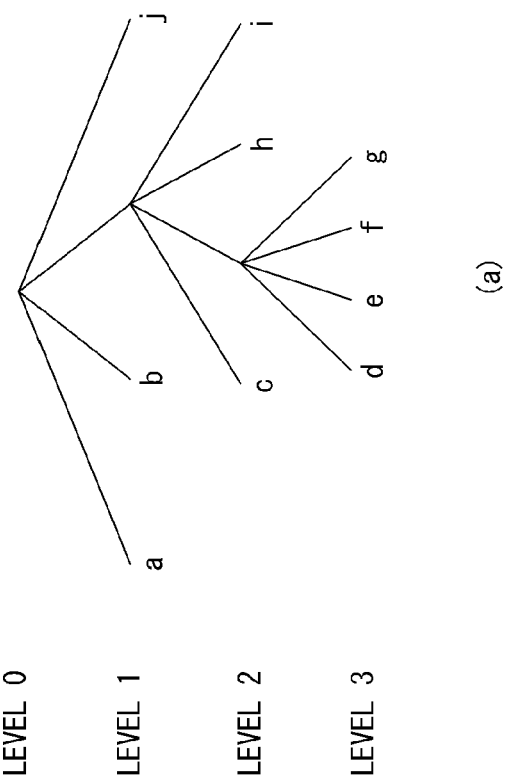
(a)
(b)
LEVEL 0
LEVEL 1
LEVEL 2
LEVEL 3

[Fig. 4]
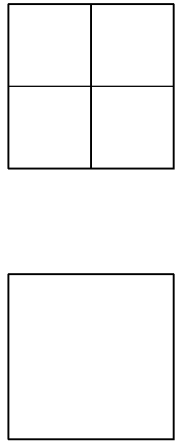
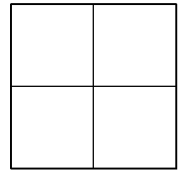
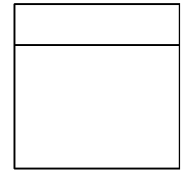
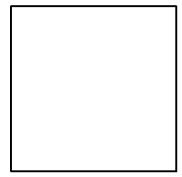
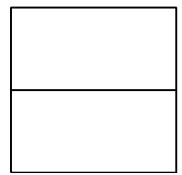
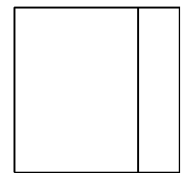

【Fig. 5】
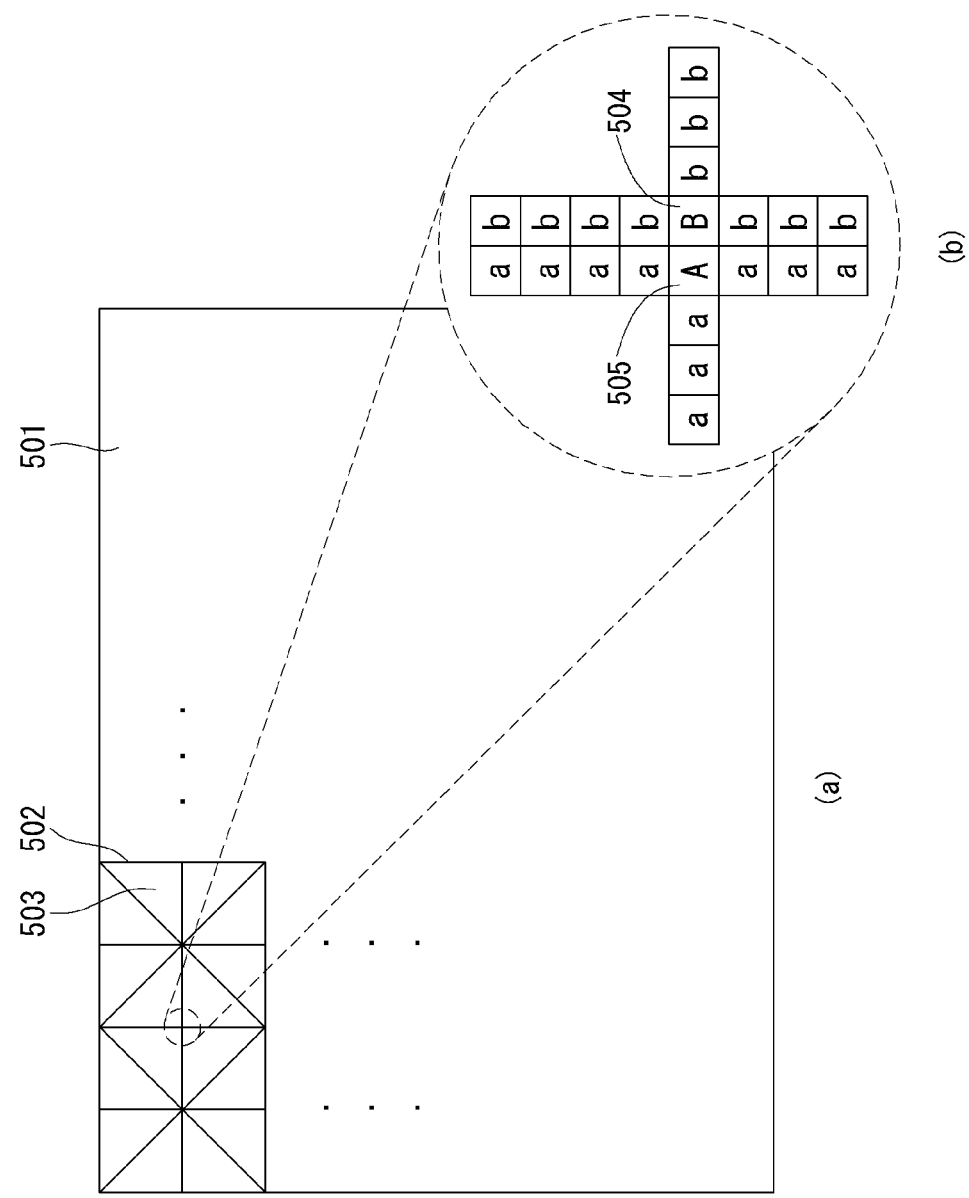

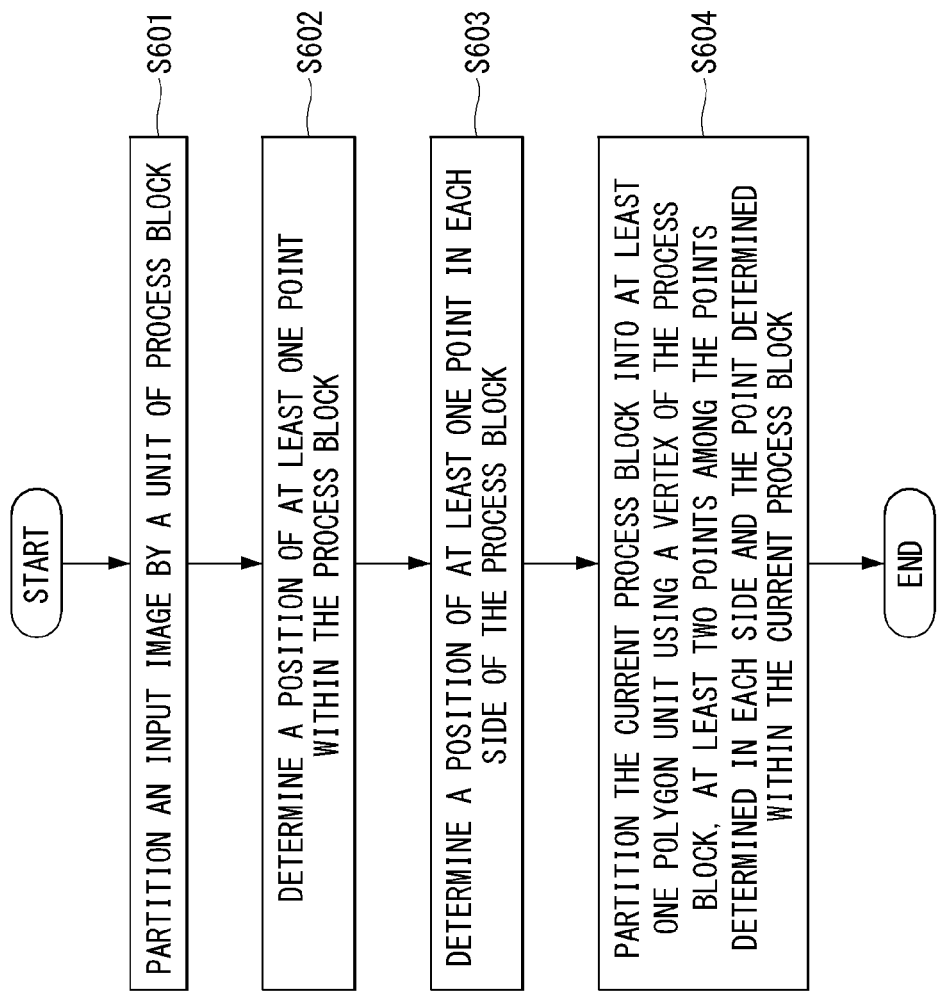
[Fig. 6]

[Fig. 7]
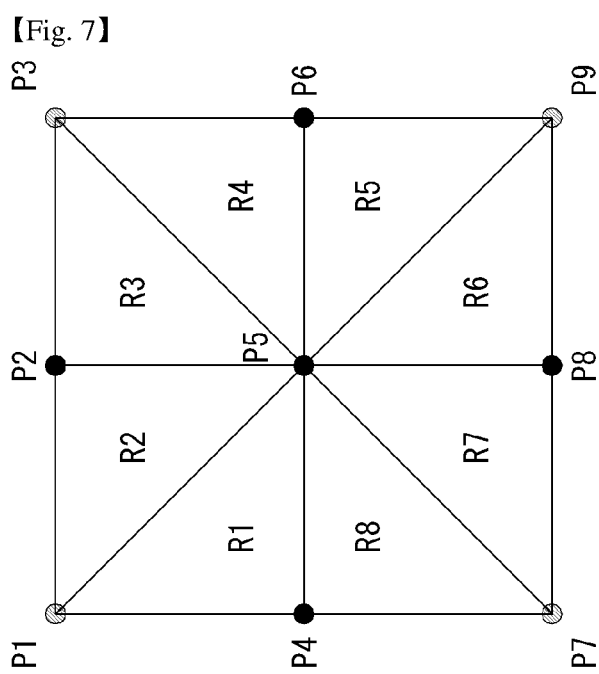

[Fig. 8]
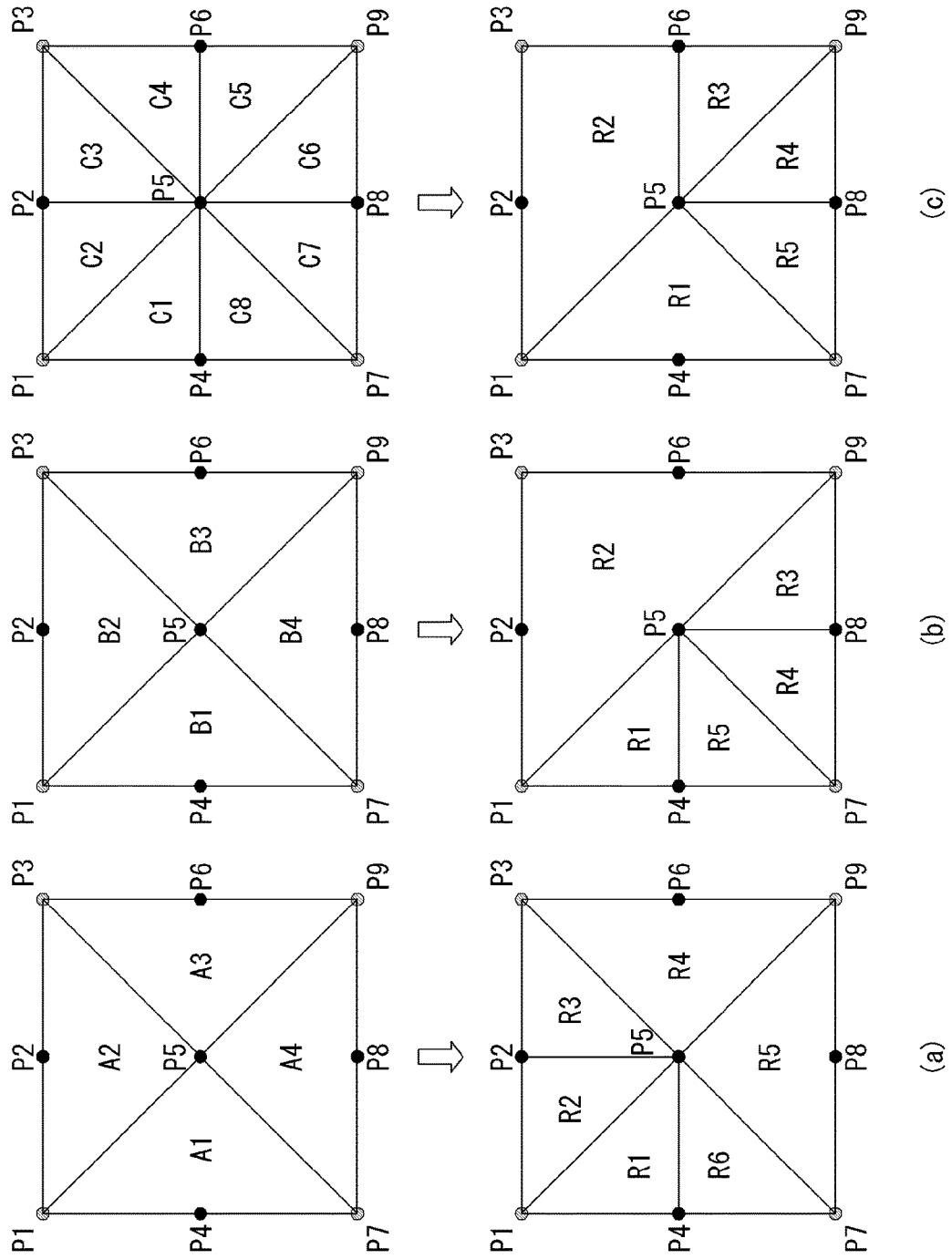

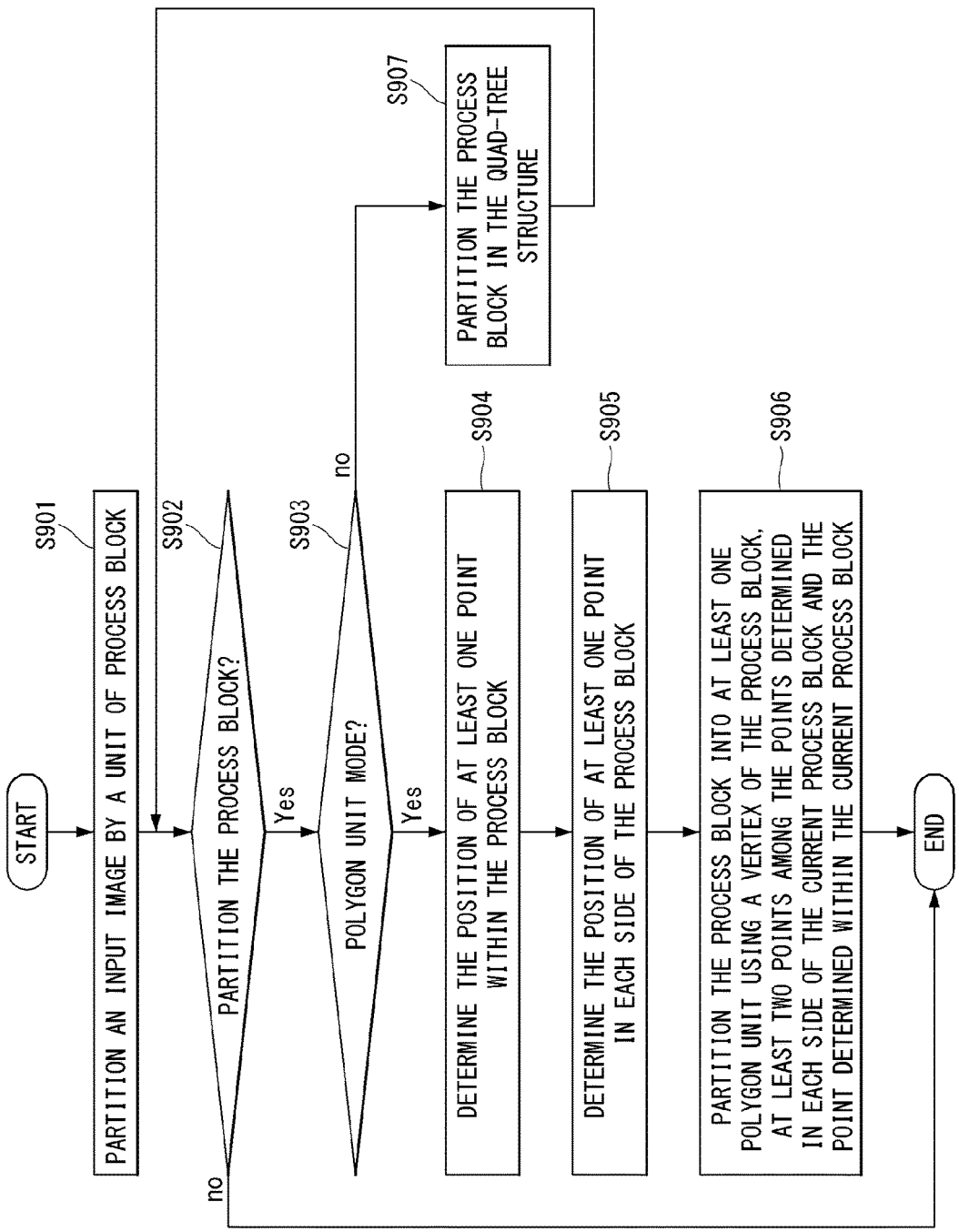

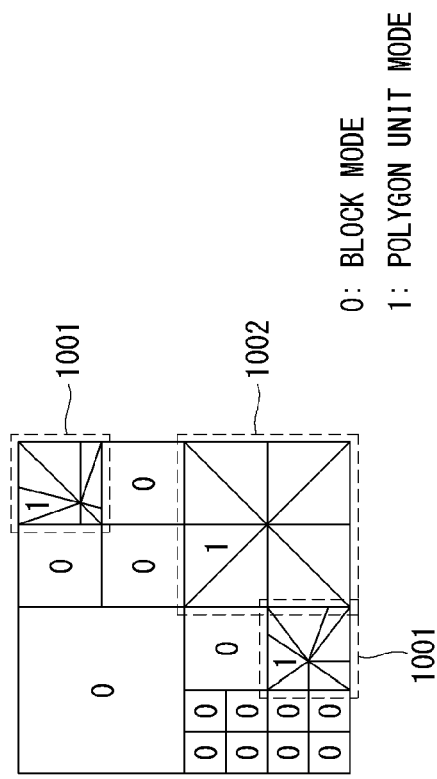
[Fig. 10]

[Fig. 11]
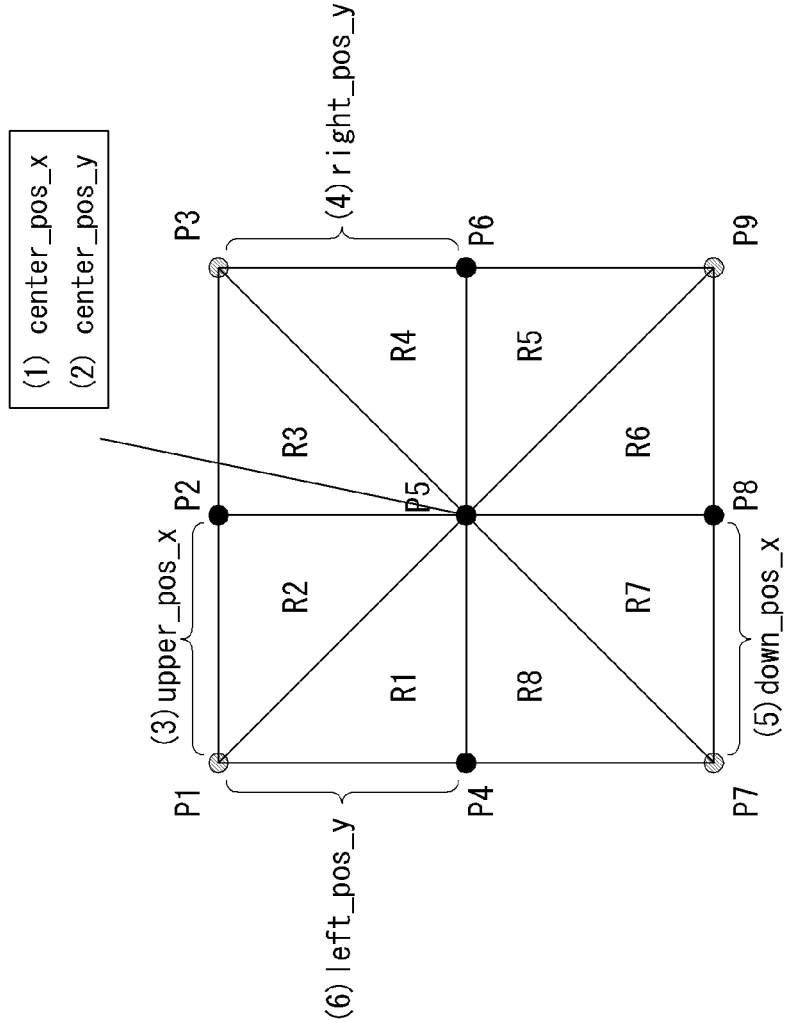

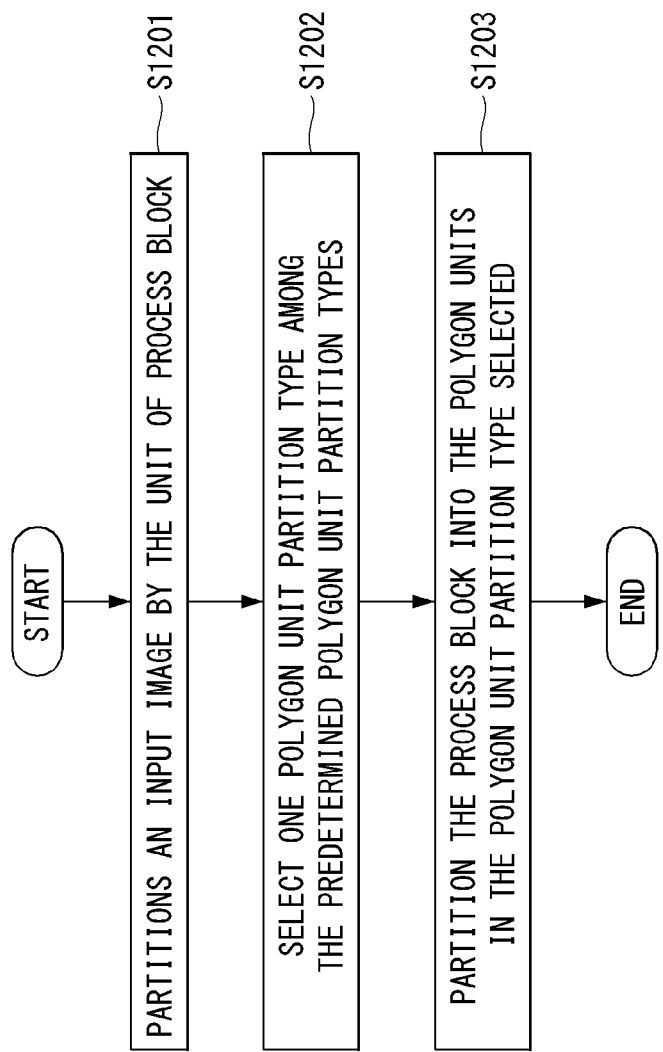
[Fig. 12]

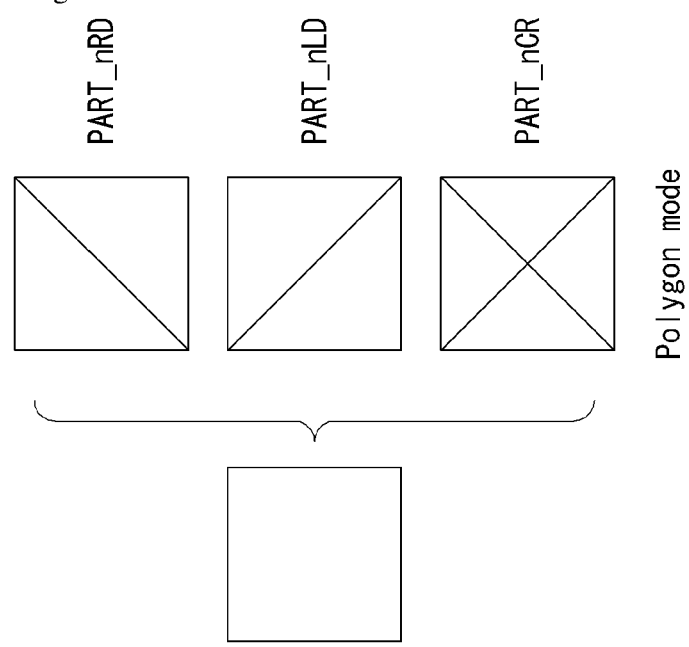
[Fig. 13]

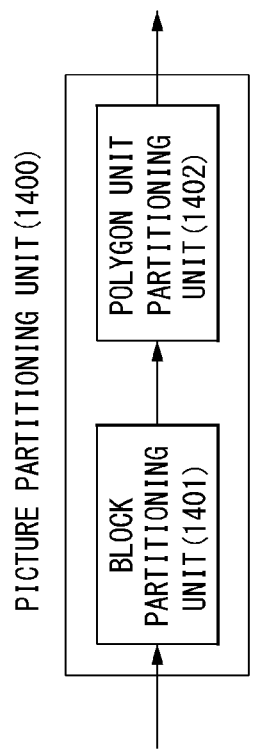
[Fig. 14]

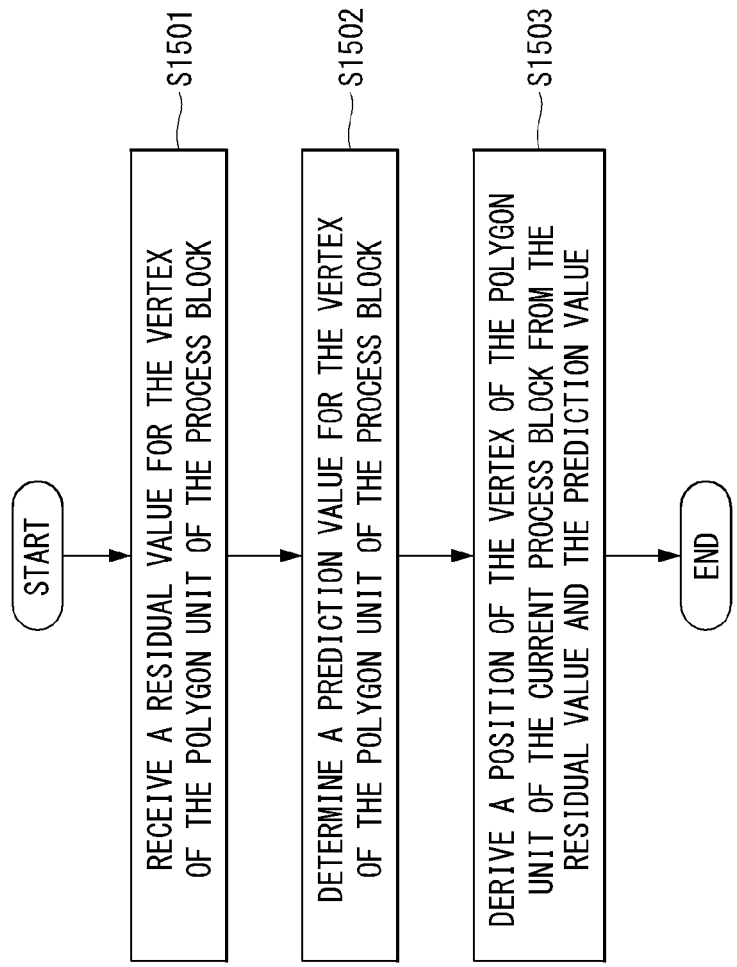
[Fig. 15]

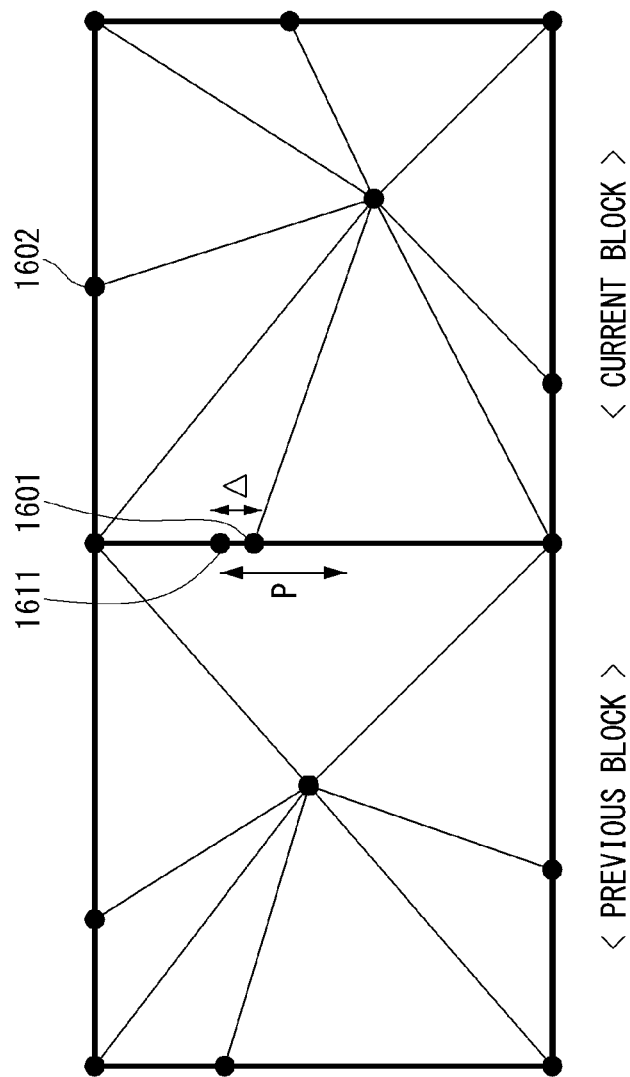

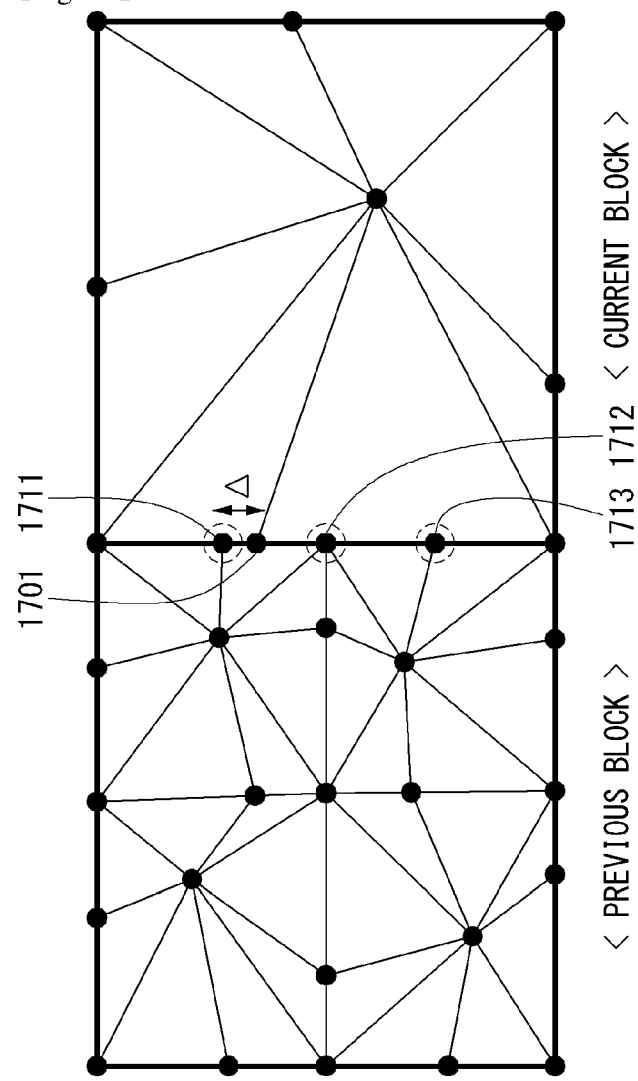
[Fig. 17]

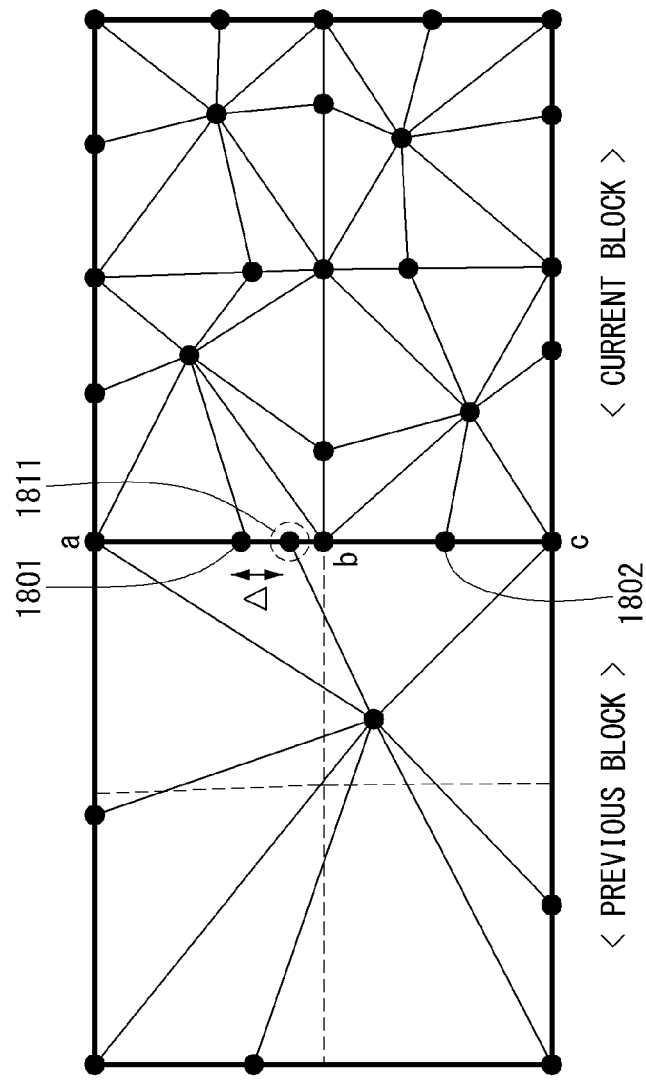
[Fig. 18]

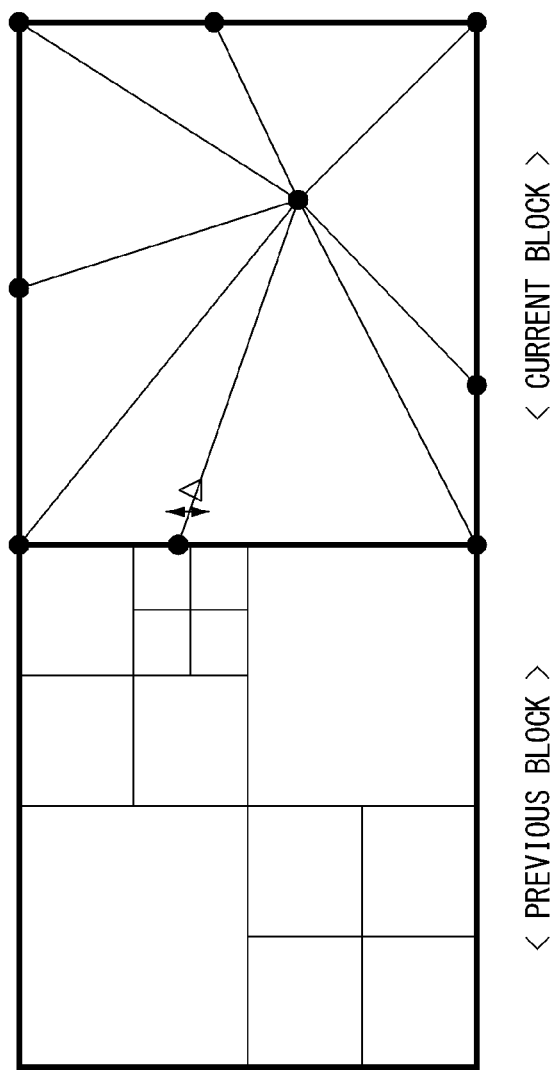
[Fig. 19]

[Fig. 20]
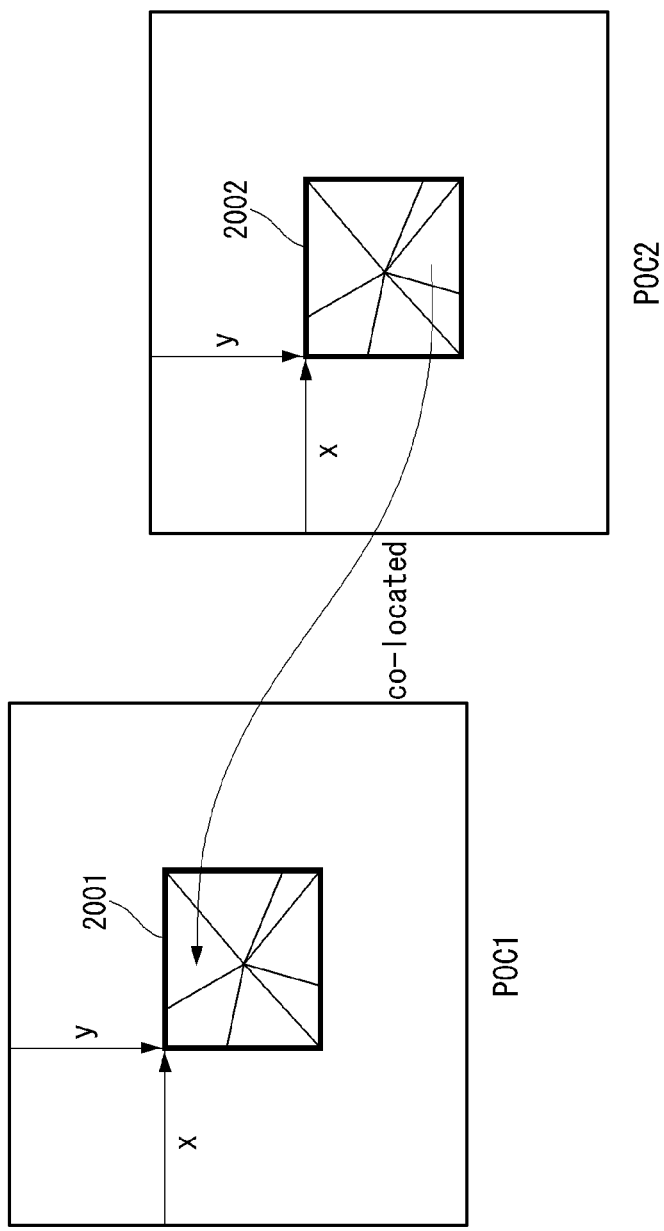

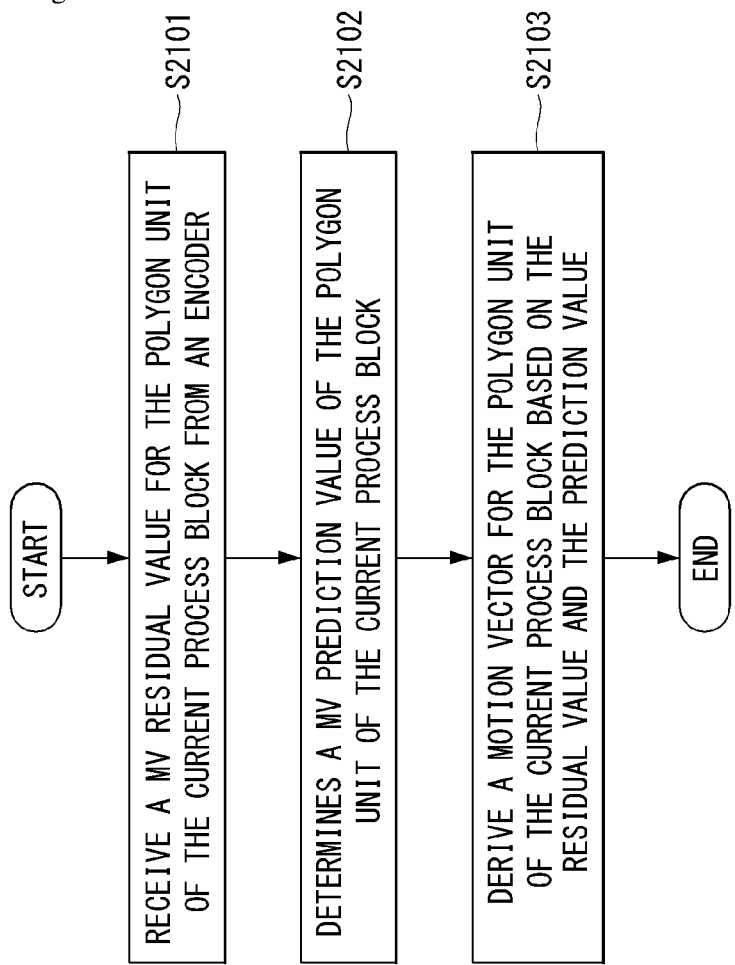
[Fig. 21]

[Fig. 22]
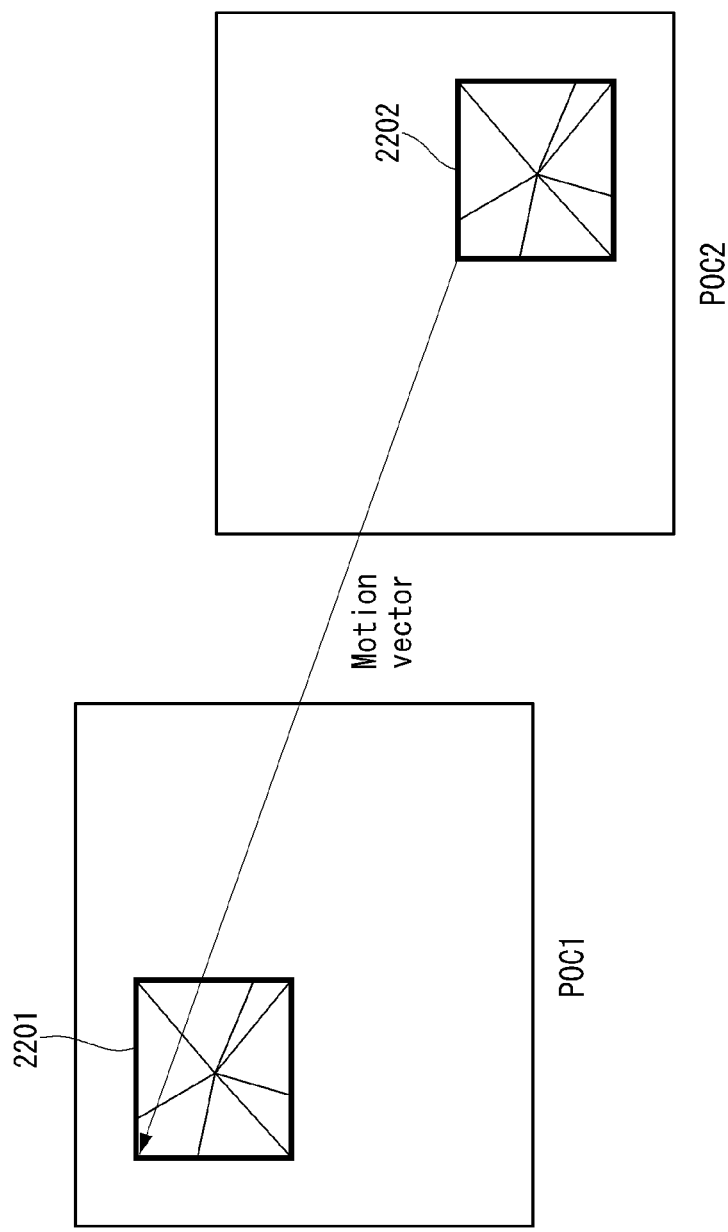

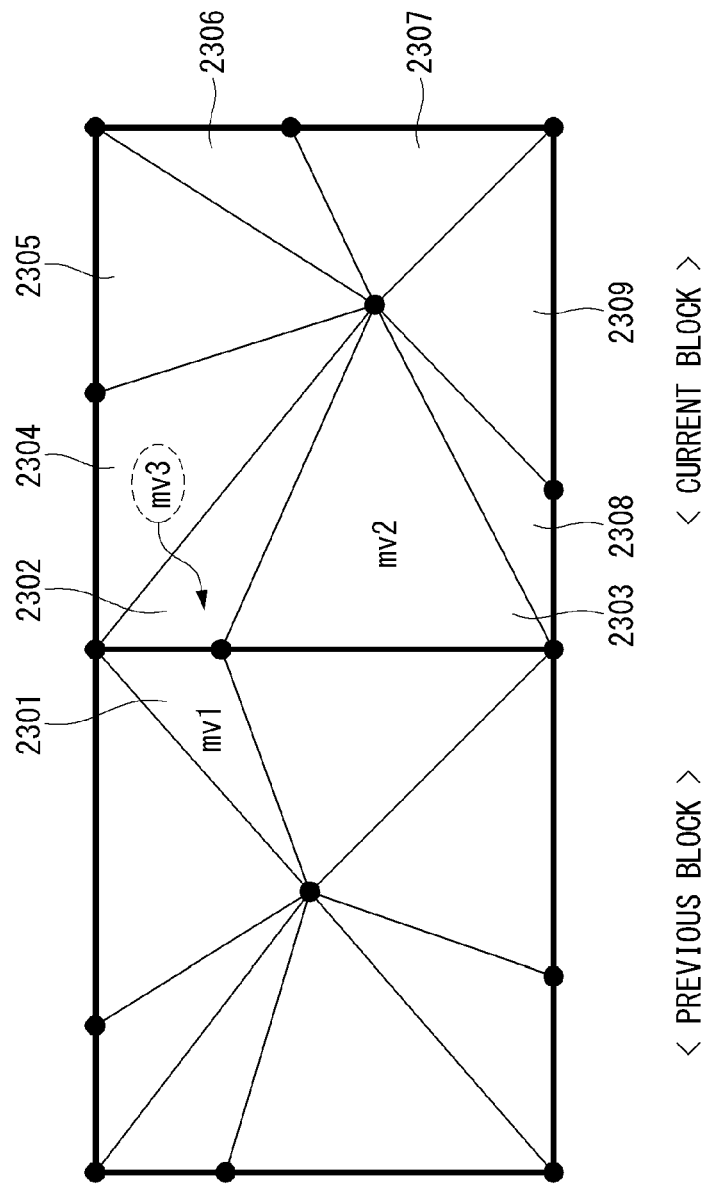

[Fig. 24]
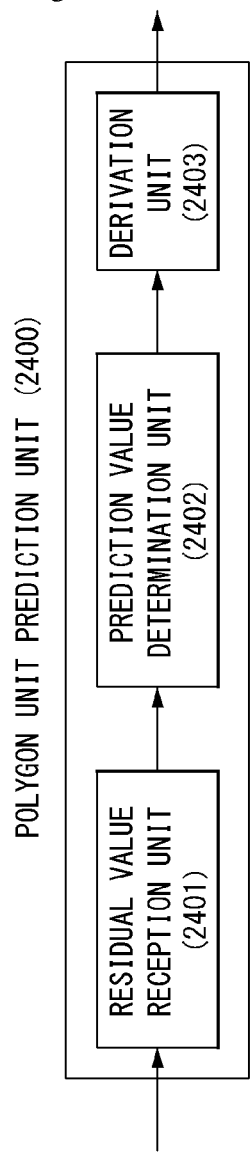

METHOD FOR ENCODING/DECODING IMAGE ON BASIS OF POLYGON UNIT AND APPARATUS THEREFOR

This application is a National Phase Application of International Application No. PCT/KR2015/002134, filed on Mar. 5, 2015, which claims the benefit of U.S. Provisional Application No. 61/948,511, filed Mar. 5, 2014, U.S. Provisional Application No. filed, which are hereby incorporated by reference in their entirety for all purposes as if fully set forth herein.

TECHNICAL FIELD

The present invention relates to a method for encoding/decoding a still image or a video, and more particularly, to a method for encoding/decoding a still image or a video based on a polygon unit and an apparatus for supporting the same.

BACKGROUND ART

A compression encoding means a series of signal processing techniques for transmitting digitized information through a communication line or techniques for storing the information in a form that is proper for a storage medium. The media including a picture, an image, an audio, and the like may be the target for the compression encoding, and particularly, the technique of performing the compression encoding targeted to the picture is referred to as a video image compression.

The next generation video contents are supposed to have the characteristics of high spatial resolution, high frame rate and high dimensionality of scene representation. In order to process such contents, drastic increase of memory storage, memory access rate and processing power will be resulted.

Accordingly, it is required to design the coding tool for processing the next generation video contents efficiently.

DISCLOSURE

Technical Problem

In the conventional compression technique of a still image or a video, the block-based image compression method is used. In the block-based image compression method, the images are compressed by being divided in a fixed form of a squire. Accordingly, the method may not properly reflect the characteristics of images. Particularly, the method is not proper for coding of complex textures.

In order to solve the problem above, an object of the present invention is to propose a method for encoding/decoding a still image or a video based on a polygon unit that has a triangle shape or an arbitrary shape.

The objects of the present invention are not limited to the technical objects described above, and other technical that are objects not mentioned herein may be understood to those skilled in the art from the description below.

Technical Solution

In an aspect, a method for encoding an image based on a polygon unit may include partitioning an input image by a unit of block, determining a position of at least one point within the block, determining a position of at least one point in each side of the block, partitioning the block into at least one polygon unit using a vertex of the block, at least two points among the points determined in the side of the block, and a point determined within the block and coding the input image by a unit of the polygon unit.

In another aspect, an apparatus for encoding an image based on a polygon unit may include a block partitioning unit for partitioning an input image by a unit of block, and a polygon unit partition unit for determining a position of at least one point within the block and a position of at least one point in each side of the block, and for partitioning the block into at least one polygon unit using a vertex of the block, at least two points among the points determined in the side of the block, and a point determined within the block.

Preferably, the point within the block or the point in each side of the block may be determined as a point where rate-distortion cost is a minimum.

Preferably, a position of the point within the block may be determined to be a center point of the block.

Preferably, a position of the point in each side of the block may be determined to be a position where a gradient in each side is a greatest.

Preferably, the method may further include generating a single polygon unit by merging adjacent polygon units among the partitioned at least one polygon unit.

Preferably, the method may further include partitioning the block in a Quad-tree structure.

Preferably, the method may further include determining whether the block is partitioned in the Quad-tree structure or in the polygon unit.

In still another aspect, a method for decoding an image based on a polygon unit may include receiving a residual value for a vertex of a polygon unit that is partitioned from a block that constructs an image, determining a prediction value for the vertex of the polygon unit, deriving a position of the vertex of the polygon unit based on the residual value and the prediction value and decoding the image by a unit of the polygon.

In yet another aspect, an apparatus for decoding an image based on a polygon unit may include a residual value reception unit for receiving a residual value for a vertex of a polygon unit that is partitioned from a block that constructs an image, a prediction value determination unit for determining a prediction value for the vertex of the polygon unit and a derivation unit for deriving a position of the vertex of the polygon unit based on the residual value and the prediction value.

Preferably, the prediction value may be determined as a position of a partition point that is located in a side of a block adjacent to the block.

Preferably, the prediction value may be determined to be a point among the partition points that are located in the side of the adjacent block, when a number of polygon vertexes located in the side of the adjacent block is more than a number of the partition points located in the side of the block.

Preferably, the prediction value may be determined to be an average value or a median value of a displacement value from a center point of the partition point located in the side of the adjacent block, when a number of polygon vertexes located in the side of the adjacent block is more than a number of the partition points located in the side of the block.

Preferably, the prediction value may be determined to be a position of the partition point located within a range in which the vertex of the polygon unit is available to be located, when a number of polygon vertexes located in the side of the block is more than a number of polygon vertexes in the side of the adjacent block.

Preferably, the adjacent block may be partitioned in a unit of polygon unit or in a Quad-tree structure.

Preferably, the prediction value may be determined to be a position of a vertex of a polygon unit in a block that is collocated with the block.

In still another aspect, a method for decoding an image based on a polygon unit may include receiving a motion vector residual value for a polygon unit that is partitioned from a block that constructs an image, determining a motion vector prediction value for the polygon unit, deriving a motion vector for the polygon unit based on the residual value and the prediction value and decoding the image by a unit of the polygon.

In yet another aspect, an apparatus for decoding an image based on a polygon unit may include a residual value reception unit for receiving a motion vector residual value for a polygon unit that is partitioned from a block that constructs an image, a prediction value determination unit for determining a motion vector prediction value for the polygon unit and a derivation unit for deriving a motion vector for the polygon unit based on the residual value and the prediction value.

Preferably, the motion vector prediction value may be determined to be a motion vector value of the block.

Preferably, the motion vector prediction value may be determined to be a motion vector value of a polygon unit adjacent to the polygon unit.

Technical Effects

According to the embodiment of the present invention, complex images may be efficiently processed by encoding/decoding a still image or a video based on a polygon unit that has a triangle shape or an arbitrary shape.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 is illustrates a schematic block diagram of an encoder in which the encoding of a video signal is performed, as an embodiment to which the present invention is applied.

FIG. 2 illustrates a schematic block diagram of a decoder in which decoding of a video signal is performed, as an embodiment to which the present invention is applied.

FIG. 3 is a diagram for describing a partition structure of a coding unit that may be applied to the present invention.

FIG. 4 is a diagram for describing a prediction unit that may be applied to the present invention.

FIG. 5 is a diagram for describing a polygon unit according to an embodiment of the present invention.

FIG. 6 is a diagram illustrating a coding method based on a polygon unit according to an embodiment of the present invention.

FIG. 7 is a diagram illustrating a polygon unit partition according to an embodiment of the present invention.

FIG. 8 is a diagram illustrating a polygon unit partition according to an embodiment of the present invention.

FIG. 9 is a diagram illustrating a coding method based on a polygon unit according to an embodiment of the present invention.

FIG. 10 is a diagram illustrating a polygon unit partition according to an embodiment of the present invention.

FIG. 11 is a diagram for describing a coordinate of a polygon unit according to an embodiment of the present invention.

FIG. 12 is a diagram for describing a coding method based on a polygon unit according to an embodiment of the present invention.

FIG. 13 is a diagram illustrating a polygon unit partition type according to an embodiment of the present invention.

FIG. 14 illustrates a schematic inner block diagram of a picture partitioning unit that performs a polygon unit partition according to an embodiment of the present invention.

FIG. 15 is a diagram illustrating a decoding method based on a polygon unit according to an embodiment of the present invention.

FIG. 16 is a diagram illustrating a prediction method of a polygon unit partition structure according to an embodiment of the present invention.

FIG. 17 is a diagram illustrating a prediction method of a polygon unit partition structure according to an embodiment of the present invention.

FIG. 18 is a diagram illustrating a prediction method of a polygon unit partition structure according to an embodiment of the present invention.

FIG. 19 is a diagram illustrating a prediction method of a polygon unit partition structure according to an embodiment of the present invention.

FIG. 20 is a diagram illustrating a prediction method of a polygon unit partition structure according to an embodiment of the present invention.

FIG. 21 is a diagram illustrating a decoding method based on a polygon unit according to an embodiment of the present invention.

FIG. 22 is a diagram illustrating a prediction method of a motion vector of a polygon unit according to an embodiment of the present invention.

FIG. 23 is a diagram illustrating a prediction method of a motion vector of a polygon unit according to an embodiment of the present invention.

FIG. 24 illustrates a schematic inner block diagram of a polygon unit prediction unit that performs a prediction for a polygon unit according to an embodiment of the present invention.

BEST MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. And, the specific terminology may be modified into other forms within the scope of the technical concept of the present invention. For example, a signal, data, a sample, a picture, a frame, a block, etc may be properly replaced and interpreted in each coding process.

FIG. 1 is illustrates a schematic block diagram of an encoder in which the encoding of a video signal is performed, as an embodiment to which the present invention is applied.

Referring to FIG. 1, an encoder 100 may include a picture partitioning unit 110, a subtract unit 115, a transform unit 120, a quantization unit 130, a dequantization unit 140, an inverse transform unit 150, a filtering unit 160, a decoded picture buffer (DPB) 170, a prediction unit 180 and an entropy encoding unit 190. And the prediction unit 180 may include an inter-prediction unit 181 and an intra-prediction unit 182.

The picture partitioning unit 110 partitions an input video signal (or, picture frame) inputted to the encoder 100 into one or more process unit blocks (hereinafter, referred to 'process block' or 'block'). Here, the process unit block may be a coding tree unit (CTU), a coding unit (CU), a prediction unit (PU) or a transform unit (TU).

Particularly, in the present invention, the picture partitioning module 110 may divide a single process block into one or more polygon units. The polygon unit according to the present invention is a basic unit of encoding and decoding for an input picture, and means a unit of polygon shape which is divided from a block based on three or more pixels.

The picture partitioning unit 110 may implement the partitioning process and/or method of the polygon unit that is proposed in the embodiment described below. More detailed description of the partitioning method of the polygon unit will be described below.

The subtract unit 115 generates a residual signal by subtracting the prediction signal that is outputted from the prediction unit 180 (i.e., the inter-prediction unit 181 or the intra-prediction unit 182) from the input video signal. The generated residual signal is transmitted to the transform unit 120.

The transform unit 120 generates a transform coefficient by applying a transform technique to the residual signal.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal that is outputted from the quantization unit 130 may be used for generating a prediction signal. For example, by applying dequantization and inverse transformation to the quantized signal through the dequantization unit 140 and the inverse transform unit 150, the residual signal may be reconstructed. By adding the reconstructed residual signal to the prediction signal that is outputted from the inter-prediction unit 181 or the intra-prediction unit 182, a reconstructed signal may be generated.

On the other hand, during such a compression process, adjacent blocks are quantized by different quantization parameters from each other, and accordingly, an artifact in which block boundaries are shown may occur. Such a phenomenon is referred to blocking artifact, which is one of the important factors for evaluating image quality. In order to decrease such an artifact, a filtering process may be performed. Through such a filtering process, the blocking artifact is removed and the error for the current picture is decreased at the same time, thereby the image quality being improved.

The filtering unit 160 applies filtering to the reconstructed signal, and outputs it through a play-back device or transmits it to the decoded picture buffer 170. The filtered signal transmitted to the decoded picture buffer 170 may be used as a reference picture in the inter-prediction unit 181. As such, by using the filtered picture as a reference picture in an inter-picture prediction mode, the encoding rate as well as the image quality may be improved.

The decoded picture buffer 170 may store the filtered picture in order to use it as a reference picture in the inter-prediction unit 181.

The inter-prediction unit 181 performs a temporal prediction and/or a spatial prediction by referencing the reconstructed picture in order to remove a temporal redundancy and/or a spatial redundancy. Here, since the reference picture used for performing a prediction is a transformed signal that goes through the quantization or the dequantization by a unit of block when being encoded/decoded previously, there may exist blocking artifact or ringing artifact.

Accordingly, in order to solve the performance degradation owing to the discontinuity of such a signal or the quantization, by applying a low pass filter to the inter-prediction unit 181, the signals between pixels may be interpolated by a unit of sub-pixel. Herein, the sub-pixel means a virtual pixel that is generated by applying an interpolation filter, and an integer pixel means an actual pixel that is existed in the reconstructed picture. As a method of interpolation, a linear interpolation, a bi-linear interpolation, a wiener filter, and the like may be applied.

The interpolation filter may be applied to the reconstructed picture, and may improve the accuracy of prediction. For example, the inter-prediction unit 181 may perform prediction by generating an interpolation pixel by applying the interpolation filter to the integer pixel, and by using the interpolated block that includes interpolated pixels as a prediction block.

The intra-prediction unit 182 predicts the current block by referring to the samples adjacent the block that is to be encoded currently. The intra-prediction unit 182 may perform the following procedure in order to perform the intra-prediction. First, the intra-prediction unit 182 may prepare a reference sample that is required for generating a prediction signal. And, the intra-prediction unit 182 may generate a prediction signal by using the reference sample prepared. Later, the intra-prediction unit 182 may encode the prediction mode. In this case, the reference sample may be prepared through reference sample padding and/or reference sample filtering. Since the reference sample goes through the prediction and the reconstruction process, there may be a quantization error. Accordingly, in order to decrease such an error, the reference sample filtering process may be performed for each prediction mode that is used for the intra-prediction.

The prediction signal that is generated through the inter-prediction unit 181 or the intra-prediction unit 182 may be used for generating the reconstructed signal or the residual signal.

FIG. 2 illustrates a schematic block diagram of a decoder in which decoding of a video signal is performed, as an embodiment to which the present invention is applied.

Referring to FIG. 2, a decoder 200 may include an entropy decoding unit 210, a dequantization unit 220, an inverse transform unit 230, an add unit 235, a filtering unit 240, a decoded picture buffer (DPB) 250 and a prediction unit 260. And the prediction unit 260 may include an inter-prediction unit 261 and an intra-prediction unit 262.

And, the reconstructed video signal outputted through the decoder 200 may be played through a play-back device.

The decoder 200 receives the signal (i.e., bit stream) outputted from the encoder 100 shown in FIG. 1, and the entropy decoding unit 210 performs an entropy decoding operation of the received signal.

The dequantization unit 220 acquires a transform coefficient from the entropy-decoded signal using quantization step size information.

The inverse transform unit 230 acquires a residual signal by inverse-transforming the transform coefficient.

The add unit 235 generates a reconstructed signal by adding the acquired residual signal to the prediction signal that is outputted from the prediction unit 260 (i.e., the inter-prediction unit 261 or the intra-prediction unit 262).

Particularly, in the present invention, the inter-prediction unit 261 or the intra-prediction unit 262 may implement the process and/or method for a division structure (i.e., a vertex position) of the polygon unit or predicting a motion vector of the polygon unit that are proposed in the embodiments of the present invention.

The filtering unit 240 applies filtering to the reconstructed signal, and outputs it through a play-back device or transmits it to the decoded picture buffer 250. The filtered signal transmitted to the decoded picture buffer 250 may be used as a reference picture in the inter-prediction unit 261.

In this specification, the embodiments described in the filtering unit 160, the inter-prediction unit 181 and the intra-prediction unit 182 of the encoder 100 may also be applied to the filtering unit 240, the inter-prediction unit 261 and the intra-prediction unit 262 of the decoder, respectively, in the same way.

Generally, the block-based image compression method is used in the compression technique (e.g., HEVC) of a still image or a video. The block-based image compression method is a method of processing an image by partitioning it into a specific block unit, and may decrease the use of memory and the amount of operation.

FIG. 3 is a diagram for describing a partition structure of a coding unit that may be applied to the present invention.

An encoder partitions a single image (or picture) in a coding tree unit (CTU) of a rectangle shape, and encodes the CTU sequentially one by one according to a raster scan order.

In the HEVC, a size of CTU may be determined by one of 64×64, 32×32 and 16×16. The encoder may select and use the size of CTU according to the resolution of input image or the characteristics of input image. The CTU includes a coding tree block (CTB) for a luma component and the CTB for two chroma components that correspond to it.

A single CTU may be partitioned into a Quad-tree structure. A single CTU may have a square shape and may be partitioned into four units of which a length of each side decreases by half. Such a partitioning of the Quad-tree structure may be performed recursively.

Referring to FIG. 3, the root node of the Quad-tree is related to the CTU. The Quad-tree is partitioned until it reaches to a leaf node, and the leaf node is referred to as a coding unit (CU).

The CU means a basic unit of processing process of an input image, for example, the coding in which the intra/inter prediction is performed. The CU includes a coding block (CB) for a luma component and the CB for two chroma components that correspond to it. In the HEVC, a size of CU may be determined by one of 64×64, 32×32, 16×16 and 8×8.

Referring to FIG. 3, the CTU corresponds to a root node, and has a smallest depth value (i.e., level 0). According to the characteristics of an input image, the CTU may not be partitioned. In this case, the CTU corresponds to a CU.

The CTU may be partitioned in a Quad-tree shape, and as a result, the lower nodes that have a depth of level 1 are generated. And, the node (i.e., leaf node) that is not partitioned anymore from the lower node that has a depth of level 1 corresponds to a CU. For example, in FIG. 3(b), each of CU(a), CU(b) and CU(j) that corresponds to node a, node b and node j, respectively, is partitioned once in the CTU, and has a depth of level 1.

Any one of the node that has a depth of level 1 may be further partitioned into a Quad-tree shape again. And, the node (i.e., leaf node) that is not partitioned anymore from the lower node that has a depth of level 2 corresponds to a CU. For example, in FIG. 3(b), each of CU(c), CU(h) and CU(i) that corresponds to node c, node h and node i, respectively, is partitioned twice in the CTU, and has a depth of level 2.

In addition, any one of the node that has a depth of level 2 may be further partitioned into a Quad-tree shape again. And, the node (i.e., leaf node) that is not partitioned anymore from the lower node that has a depth of level 3 corresponds to a CU. For example, in FIG. 3(b), each of CU(d), CU(e), CU(f) and CU(g) that corresponds to node d, node e, node f and node g, respectively, is partitioned three times in the CTU, and has a depth of level 3.

In an encoder, the maximum size or the minimum size of a CU may be determined according to the characteristics of a video image (e.g., resolution) or by considering encoding rate. And, the information for this or the information that may derive this may be included in a bit stream. The CU that has the maximum size is referred to as a largest coding unit (LCU), and the CU that has the minimum size is referred to as a smallest coding unit (SCU).

In addition, the CU that has a tree structure may be hierarchically partitioned with predetermined maximum depth information (or maximum level information). And, each partitioned CU may have the depth information. Since the depth information represents a partitioned count and/or degree of a CU, the depth information may include the information of a size of CU.

Since the LCU is partitioned in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a partition CU flag (split_cu_flag)) that represents whether the corresponding CU is partitioned may be forwarded to a decoder. This partition information is included in all CUs except the SCU. For example, when the value of the flag that represents whether to partition is '1', the corresponding CU is further partitioned into four CUs, and when the value of the flag that represents whether to partition is '0', the corresponding CU is not partitioned any more, and the processing process for the corresponding CU may be performed.

Although the partition process of a CU is described as an example in the embodiment of FIG. 3, the Quad-tree structure described above may also be applied to the partition process of a transform unit (TU) that is a basic unit of performing a transformation.

The TU is partitioned hierarchically in a Quad-tree structure from the CU that is to be coded. That is, the CU corresponds to a root node of the tree for a transform unit (TU).

Since the TU is partitioned in a Quad-tree structure, the TU that is partitioned from a CU may be further partitioned into a smaller lower TU. In the HEVC, a size of CU may be determined by one of 32×32, 16×16, 8×8 and 4×4.

For a single TU, the information (e.g., a partitioned TU flag (split_transform_flag)) that represents whether the corresponding TU is partitioned may be forwarded to a decoder. This partition information is included in all TUs except the TU of minimum size. For example, when the value of the flag that represents whether to partition is '1', the corresponding TU is further partitioned into four TUs, and when the value of the flag that represents whether to partition is '0', the corresponding TU is not partitioned any more.

As described above, the CU is a basic unit of the coding in which the intra-prediction or the inter-prediction is performed. The HEVC partitions the CU in a prediction unit (PU) for coding an input image more effectively.

The PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

The PU is not partitioned in the Quad-tree structure, but is partitioned once in a single CU in a predetermined shape. This will be described by reference to the drawing below.

FIG. 4 is a diagram for describing a prediction unit that may be applied to the present invention.

A PU is differently partitioned depending on whether the intra-prediction mode is used or the inter-prediction mode is used as the coding mode of the CU to which the PU belongs.

FIG. 4(a) illustrates a PU of the case that the intra-prediction mode is used, and FIG. 4(b) illustrates a PU of the case that the inter-prediction mode is used.

Referring to FIG. 4(a), assuming the case that the size of a single CU is 2N×2N (N=4, 8, 16 and 32), a single CU may be partitioned into two types (i.e., 2N×2N or N×N).

Here, in the case that a single CU is partitioned into the PU of 2N×2N shape, it means that only one PU is existed in a single CU.

On the other hand, in the case that a single CU is partitioned into the PU of N×N shape, a single CU is partitioned into four PUs, and different prediction blocks are generated for each PU unit. However, such a PU partition may be performed only in the case that the size of CB for the luma component of CU is the minimum size (i.e., the case that a CU is an SCU).

Referring to FIG. 4(b), assuming the case that the size of a single CU is 2N×2N (N=4, 8, 16 and 32), a single CU may be partitioned into eight PU types (i.e., 2N×2N, N×N, 2N×N, N×2N, nL×2N, nR×2N, 2N×nU and 2N×nD)

Similar to the intra-prediction, the PU partition of N×N shape may be performed only in the case that the size of CB for the luma component of CU is the minimum size (i.e., the case that a CU is an SCU).

The inter-prediction supports the PU partition in the shape of 2N×N that is partitioned in a horizontal direction and in the shape of N×2N that is partitioned in a vertical direction.

In addition, the inter-prediction supports the PU partition in the shape of nL×2N, nR×2N, 2N×nU and 2N×nD, which is an asymmetric motion partition (AMP). Here, 'n' means ¼ value of 2N. However, the AMP may not be used in the case that the CU to which the PU is belonged is the CU of minimum size.

In order to encode the input image in a single CTU efficiently, the optimal partition structure of the coding unit (CU), the prediction unit (PU) and the transform unit (TU) may be determined based on a minimum rate-distortion value through the processing process as follows. For example, as for the optimal CU partition process in a 64×64 CTU, the rate-distortion cost may be calculated through the partition process from the CU of 64×64 size to the CU of 8×8 size. The detailed process is as follows.

1) The optimal partition structure of PU and TU that generates the minimum rate distortion value is determined through performing the inter/intra-prediction, the transformation/quantization, the dequantization/inverse transformation and the entropy encoding for the CU of 64×64 size.

2) The optimal partition structure of PU and TU is determined to partition the 64×64 CU into four CUs of 32×32 size and to generate the minimum rate distortion value for each 32×32 CU.

3) The optimal partition structure of PU and TU is determined to further partition the 32×32 CU into four CUs of 16×16 size and to generate the minimum rate distortion value for each 16×16 CU.

4) The optimal partition structure of PU and TU is determined to further partition the 16×16 CU into four CUs of 8×8 size and to generate the minimum rate distortion value for each 8×8 CU.

5) The optimal partition structure of CU in the 16×16 block is determined by comparing the rate-distortion value of the 16×16 CU that is obtained in the process of 3) above with the addition of the rate-distortion value of the four 8×8 CUs that is obtained in the process of 4) above. This process is also performed for remaining three 16×16 CUs in the same manner.

6) The optimal partition structure of CU in the 32×32 block is determined by comparing the rate-distortion value of the 32×32 CU that is obtained in the process of 2) above with the addition of the rate-distortion value of the four 16×16 CUs that is obtained in the process of 5) above. This process is also performed for remaining three 32×32 CUs in the same manner.

7) Lastly, the optimal partition structure of CU in the 64×64 block is determined by comparing the rate-distortion value of the 64×64 CU that is obtained in the process of 1) above with the addition of the rate-distortion value of the four 32×32 CUs that is obtained in the process of 6) above.

As described above, the block-based image compression method is used for most of the conventional compression technique for a still image or a video (e.g., HEVC).

However, such a block-based image compression method may not properly reflect the characteristics of image since the partition shape of image is fixed by a square shape, and particularly, is not proper for coding of a complex texture. According to this, an image compression technique is required to compress images more efficiently.

Accordingly, the present invention proposes a method of compressing images as a unit of a polygon unit. The polygon unit proposed in the present invention will be described by reference to the drawings below.

FIG. 5 is a diagram for describing a polygon unit according to an embodiment of the present invention.

Referring to FIG. 5, a single image (or picture) 501 is partitioned into a process block 502 of a square shape. Herein, the process block 502 may be understood as a concept of embracing the coding tree unit (CTU) and the coding unit (CU) described above.

A single process block 502 may be partitioned into one or more polygon units 503 that are formed based on three or more pixels.

As described above, the polygon unit 503 means a basic unit of an input image for encoding and decoding. That is, the polygon unit 503 may be understood as a concept of embracing the coding unit (CU), the prediction unit (PU) and the transform unit (TU) described above. In addition, a single polygon unit 503 may be further partitioned into lower polygon units of which sizes are smaller.

Hereinafter, for the convenience of description in this specification, a 'pixel' is referred to as a 'point'. And, a set of consecutive points that construct a segment that connects two points is referred to as a 'side'. Consequently, each side of a single process block 502 and each side of a polygon unit includes a plurality of consecutive points.

Actually, two sides that belong to each process block 502 include a plurality of consecutive points which are different from each other. The points denoted by 'a' in FIG. 5(b) represent a right side of a left process block, and the points denoted by 'b' represent a left side of a right process block. However, for the convenience of description, similar to the denotation that each of the right side of the left process block and the left side of the right process block is shown by one side, in the drawings illustrated below, the side that is adjacent to the adjacent process blocks is denoted by a single side and described.

In addition, the point denoted by 'A' in FIG. 5(b) is a vertex of the polygon unit that is located at a right side of the left process block, and the point denoted by 'B' is a vertex of the polygon unit that is located at a left side of the right process block. However, for the convenience of description, in the case that a vertical index (or coordinate) and/or a horizontal index (or coordinate) is identical between adjacent points of the adjacent process blocks with each other, the adjacent points will be denoted by a single point in the following drawings illustrated, similar to the denotation that 'A' and 'B' are shown by a single point in FIG. 5(a).

FIG. 6 is a diagram illustrating a coding method based on a polygon unit according to an embodiment of the present invention.

Referring to FIG. 6, an encoder partitions an input image by a unit of process block (step, S601). Herein, the process block means a block of a square shape.

The encoder determines a position of at least one point within the process block that is currently to be coded (step, S602). And, the encoder determines a position of at least one point in each side of the process block that is currently to be coded (step, S603).

Here is exemplified the method for the encoder to determine a position of at least one point within the process block that is currently to be coded, and to determine a position of at least one point in each side of the process block that is currently to be coded, it is also permissible to perform in reverse order. That is, the encoder may determine a position of at least one point in each side of the process block that is currently to be coded, and then, determine a position of at least one point within the process block that is currently to be coded. In this case, the order of step, S602 and step, S603 may be interchanged.

The method of determining the point in the process block or in each side will be described below in detail.

The encoder generates a polygon unit by partitioning the current process block into at least one polygon unit using a vertex of the process block currently to be coded, at least two points among the points determined in each side and the point determined within the current process block (step, S604).

And, the encoder performs coding by a unit of polygon unit.

FIG. 7 is a diagram illustrating a coding method based on a polygon unit according to an embodiment of the present invention.

Hereinafter, for the convenience of description, it is assumed and described that a single point is determined within a single process block, and a single point is determined within each side of a process block, but the present invention is not limited thereto. That is, a plurality of points may be determined within a single process block, and similarly, a plurality of points may be determined in each side of a process block.

FIG. 7 is a diagram illustrating a polygon unit partition according to an embodiment of the present invention.

Referring to FIG. 7, when a single point is determined inside a process block and a single point is determined in each side of the process block, the eight polygon units (R1, R2, R3, R4, R5, R6, R7 and R8 regions) are generated to maximum for each process block. That is, the polygon unit may be generated by using at least two points among four points (P1, P3, P7 and P9) which are vertexes of the process block and points (P2, P4, P6 and P8) in each side, and a single point (P5) within the process block.

Herein, the four points (P1, P3, P7 and P9) which are vertexes of the process block may be fixed, and the remaining five points (e.g., P2, P4, P5, P6 and P8) may have changeable positions.

Hereinafter, for the convenience of description, (Px, Py, Pz) are referred to as the polygon unit of which vertexes are Px, Py and Pz. For example, (P1, P2, P5) is referred to as the polygon unit (i.e., R2 in FIG. 7) of which vertexes are p1, p2 and p5.

The method for determining the positions of the points (P2, P4, P5, P6 and P8) that have changeable positions will be described in more detail.

First, P5 may be freely located within the process block, and the encoding apparatus determines the position of P5 within the process block.

The single point P5 within the process block may be determined by using a full search method or other various fast search methods. Herein, all of the available methods that were used in the conventional image coding technique may be applied to the full search method or the fast search method. As an example of the fast search method, a diamond search, a cross diamond search, a new cross diamond search, and so on may be used.

The encoder generates four polygon units (i.e., (P1, P3, P5), (P1, P7, P5), (P3, P9, P5) and (P7, P9, P5)) by assuming that all points (in the case of the full search) within the process block or a candidate point (in the case of the fast search) are points located in the process block. And, the encoder may calculate a distortion (e.g., sum of square difference (SSD), sum of absolute difference (SAD), or the like) or a rate-distortion value (or cost) by comparing the four polygon unit with an original image, and may determine the point of which distortion value or the rate-distortion cost is to minimum as P5.

In addition, in order to determine the partition structure of the polygon unit more quickly, the encoder may determine the single point P5 within the process block to be the center point of the process block.

When the position of P5 is determined using the method above, four regions (or polygon units) including (P1, P2, P5)(i.e., R2+R3 region), (P1, P7, P5)(i.e., R1+R8 region), (P3, P9, P5)(i.e., R4+R5 region) and (P7, P9, P5)(i.e., R6+R7 region) are generated.

And, the encoding apparatus determines four points (i.e., P2, P4, P6 and P8) located in each side of the process block. Herein, P2 may be freely located between P1 and P3, and P4 may be freely located between P1 and P7. And P6 may be freely located between P3 and P9, and P8 may be freely located between P7 and P9.

The positions of four points (i.e., P2, P4, P6 and P8) located in each side of the process block may be determined as the point that minimize the rate-distortion cost of each polygon unit. For example, polygon units R2 and R3 may be determined to be the position that minimizes the rate-distortion cost of R2 and R3 by adjusting the position of P2 in the R2+R3 region that is generated based on P1, P3 and P5. In the same way, the polygon units of R1, R4, R5, R6, R7 and R8 are determined by adjusting positions of P4, P6 and P8.

Further, the positions of four points (i.e., P2, P4, P6 and P8) located in each side of the process block may be determined as the position in which the gradient in each side of the process block is the greatest. For example, the position of P2 may be determined to be the point at which a change is the greatest between adjacent points among the points that construct the side formed by connecting P1 and P3. In the same way, the position of P4 may be determined between P1 and P7, the position of P6 may be determined between P3 and P9, and the position of P8 may be determined between P7 and P9.

As such, when the positions of four points (i.e., P2, P4, P6 and P8) located in the side of the process block are determined, eight polygon units such as (P1, P4, P5)(R1 polygon unit), (P1, P2, P5)(R2 polygon unit), (P2, P3, P5)(R3 polygon unit), (P3, P6, P5)(R4 polygon unit), (P6, P9, P5)(R5 polygon unit), (P8, P9, P5)(R6 polygon unit), (P7, P8, P5)(R7 polygon unit) and (P4, P7, P5)(R8 polygon unit) are generated.

Although the method of determining the point located in each side of the process block after determining a single point located within the process block is described in the description above, on the contrary, a single point located within the process block may be determined first after determining the point located in each side of the process block.

Meanwhile, in the above embodiment according to FIG. 7, although the partition structure of polygon unit in which total eight polygon units are generated within a single process block is described, the less polygon units may also be generated in a single process block. That is, the four points P2, P4, P6 and P8 located in each side of the process block are determined and total eight polygon units are generated, and then the adjacent polygon units with each other may be merged. This will be described by reference to the drawing below.

FIG. 8 is a diagram illustrating a polygon unit partition according to an embodiment of the present invention.

Referring to FIG. 8(a), four polygon units A1, A2, A3 and A4 are generated using P5 that is determined within a process block and vertexes P1, P3, P7 and P9 of the process block.

And, in each of the polygon regions, the polygon is changeably partitioned into sub-polygons. Herein, the meaning of changeable partition is to partition each polygon into sub-polygons by determining the positions of P2, P4, P6 and P8 in each side of the process block, and merge the partitioned sub-polygons from the same polygon by considering the rate-distortion cost and the like. That is, for each of the polygon unit A1, A2, A3 or A4 generated using P5, P1, P3, P7 and P9, the optimal polygon unit partition structure of which rate-distortion cost is the minimum is determined.

In more detail, the rate-distortion cost is calculated for each polygon unit, and the rate-distortion cost is calculated for each of the sub-polygon units partitioned within the corresponding polygon unit.

The comparison is made between the rate-distortion cost for the polygon unit and the summation of the rate-distortion cost for each of the sub-polygon units generated within the corresponding polygon unit, and then, the polygon unit partition structure that causes the minimum rate-distortion cost is determined.

Accordingly, in the case that the structure that is partitioned from the inside of the polygon unit into the sub-polygon units is the optimal partition structure of which rate-distortion cost is minimum, the structure that is partitioned from the inside of the polygon unit into the sub-polygon units is determined. On the contrary, in the case that the structure that is not partitioned from the inside of the polygon unit into the sub-polygon units is the optimal partition structure of which rate-distortion cost is minimum, the structure that is not partitioned from the inside of the polygon unit into the sub-polygon units is determined. That is, the sub-polygon units that are partitioned inside the polygon unit may be merged.

As such, the sub-polygon units are generated by determining all of the positions P2, P4, P6 and P8 in each side of the process block, and then, the adjacent sub-polygon units generated within A1, A2, A3 and A4 may be merged by considering the rate-distortion cost.

FIG. 8(a) exemplifies the case that the sub-polygon units generated inside A3 and A4 are merged, and finally, polygon units R4 and R5 are generated, respectively. And the sub-polygon units generated inside A1 and A2 are not merged, and finally, R1 and R6, R2 and R3 are generated.

Referring to FIG. 8(b), by using P5 determined within the process block and the vertexes P1, P3, P7 and P9 of the process block, four polygon units B1, B2, B3 and B4 are changeably generated. That is, this means that the position of P5 is determined within the process block and partitioned into four polygons, and one or more adjacent polygons are merged by considering the rate-distortion cost, and the like.

In more particular, the rate-distortion cost is calculated for each of the partitioned polygon units. And, the rate-distortion cost is calculated in the structure in which one or more adjacent polygon units are merged among four polygon units. Then, the polygon unit partition structure of which rate-distortion cost is the minimum is determined That is, one or more adjacent polygon units may be merged.

And, the polygon unit that is not merged in the polygon unit partition structure determined as above may be further partitioned into smaller ones and the sub-polygon units may be determined.

FIG. 8(a) exemplifies the case that B2 and B3 regions are merged and R2 polygon unit is generated. And B1 and B4 regions that are not merged are further partitioned into R1 and R5, and R3 and R4, respectively.

Referring to FIG. 8(c), by using P5 determined within the process block, P2, P4, P6 and P8 that are determined in each side of the process block and the vertexes P1, P3, P7 and P9 of the process block, eight polygon units are generated, and the polygon unit partition structure of which rate-distortion cost is the minimum.

In other words, the rate-distortion cost is calculated for each of the partitioned polygon units. And, the rate-distortion cost is calculated in the structure in which one or more adjacent polygon units are merged among eight polygon units. Then, the polygon unit partition structure of which rate-distortion cost is the minimum is determined That is, one or more adjacent polygon units may be merged.

In FIG. 8(c), by determining all the positions of P5, P2, P4, P6 and P8, eight polygon units C1, C2, C3, C4, C5, C6, C7 and C8 are generated, and one or more adjacent polygon units are merged. In FIG. 8(c), C2, C3 and C4 are merged and R2 is generated, and C1 and C8 are merged and R1 is generated.

Meanwhile, a single process block may be partitioned by the partition structure in which the Quad-tree structure and the polygon unit partition structure are mixed. As such, the partition structure in which the Quad-tree shape and the polygon unit shape are mixed may be referred to as a hybrid structure. In addition, the unit that is generated by using the hybrid structure may be referred to as a hybrid unit (HU). The HU may be referred to as a Hybrid Coding Unit (HCU), a Hybrid Prediction Unit (HPU), or a Hybrid Transform Unit (HTU). This will be described by reference to the following drawing.

FIG. 9 is a diagram illustrating a coding method based on a polygon unit according to an embodiment of the present invention.

Referring to FIG. 9, an encoder partitions an input image by a unit of process block (step, S901). Herein, the process block means a block of square shape.

The encoder determines whether to partition the process block further (step, S902).

As a result of the determination in step, S902, when it is determined that the process block that is currently to be coded is not to be partitioned any more, the encoder performs coding by a unit of process block.

Meanwhile, as a result of the determination in step, S902, when it is determined that the process block that is currently to be coded is to be partitioned, the encoder determines whether to partition the process block currently to be coded in the partition structure (i.e., polygon mode) in the polygon unit shape or in the partition structure (i.e., block mode) in the Quad-tree shape (step, S903).

As a result of the determination in step, S903, when it is determined to partition the process block in the polygon mode, the encoder determines the position of at least one point within the process block currently to be coded (step, S904). And, the encoder determines the position of at least one point in each side of the process block currently to be coded (step, S905).

Here is exemplified the method for the encoder to determine a position of at least one point within the process block that is currently to be coded, and to determine a position of at least one point in each side of the current process block, it is also permissible to perform in reverse order. That is, the encoder may determine a position of at least one point in each side of the process block that is currently to be coded, and then, determine a position of at least one point within the current process block. In this case, the order of step, S904 and step, S905 may be interchanged.

The encoder generates a polygon unit by partitioning the process block currently to be coded into at least one polygon unit using a vertex of the process block currently to be coded, at least two points among the points determined in each side of the current process block and the point determined within the current process block (step, S906).

And, the encoder performs coding by a unit of polygon unit.

On the contrary, as a result of the determination in step, S903, when it is determined to partition the process block in the block mode, the encoder partitions the process block in the Quad-tree structure (step, S907).

And, returning to the step before step, S902 and it is determined whether to partition the process block that is partitioned in the Quad-tree structure, and the process described above is progressed until the process block is not partitioned any more.

FIG. 10 is a diagram illustrating a polygon unit partition according to an embodiment of the present invention.

Referring to FIG. 10, when the size of the process block of the highest level is 2N×2N, the process block of the highest level has the smallest depth value (i.e., level 0).

And, the process block of the highest level may be partitioned in the Quad-tree shape, and as a result, four lower level process blocks that have the depth of level 1 may be generated. That is, the process block of the highest level may be partitioned into four lower level process blocks of N×N size.

Similarly, a single process block that has N×N size may be further partitioned into the process block that has the depth of level 2 of N/2×N/2 size, and the process block of N/2×N/2 size may be further partitioned into the process block that has the depth of level 3 of N/4×N/4 size. That is, such a partition process of the process block may be performed recursively, and all of the process blocks are not required to be partitioned in the same shape.

In this case, regardless of the partition depth (i.e., level) of the process block, a single process block may be partitioned into the polygon units according to the method described in FIG. 7 and FIG. 8.

However, the process block that is partitioned into the polygon units is not partitioned in the Quad-tree shape any more. That is, the polygon unit corresponds to a leaf node.

That is, the process block in which a single process block of 2N×2N size is partitioned into the polygon units is not partitioned in the Quad-tree shape any more. Similarly, the process block in which the process block of N×N size or N/2×N/2 size is partitioned into the polygon units is not partitioned in the Quad-tree shape any more.

FIG. 10 exemplifies the case that a process block 1001 of N/2×N/2 size and a process block 1002 of N×N size are partitioned into the polygon units. In FIG. 10, for the convenience of description, the case is assumed that a single process block is partitioned into total eight polygons. As such, the process block that is partitioned in the polygon unit partition structure is not further partitioned in the Quad-tree shape any more regardless of the partition depth of the corresponding process block.

As such, when the Quad-tree partition structure and the polygon unit partition structure are mixed and used to partition a single process block, the indication information is required on whether each of the process block is partitioned in the Quad-tree shape or in the polygon unit shape. For example, a partition mode flag (e.g., coding unit mode flag) is defined. And '0' indicates the partition structure (i.e., block mode) of the Quad-tree shape, and '1' indicates the partition structure (i.e., polygon unit mode) of the polygon unit shape.

In other words, a decoder may determine whether the process block that is currently decoded is partitioned in the block mode or decoded in the polygon unit mode by receiving the flag information that indicates the partition mode from an encoder.

This will be described in more detail.

As an example, for a unit of coding unit (CU), the hybrid structure described above may be applied. That is, in this case, the process block corresponds to the coding unit.

Hereinafter, in the syntax exemplified in this specification, the syntax element defined in the conventional HEVC may refer to the HEVC standard document, and the detailed description for this is omitted.

Table 1 exemplifies the syntax for the hybrid structure of a CU unit.

TABLE 1

| | Descriptor |
|---|---|
| coding_unit( x0, y0, log2CbSize ) { | |
|   if( hybrid_coding_unit_enabled_flag ) | |
|     cu_hybrid_flag | ae(v) |
|   if( cu_hybrid_flag) { | |
|     ...* | |
|   } | |
|   else { | |
|     if( transquant_bypass_enabled_flag ) | |
|       cu_transquant_bypass_flag | ae(v) |
|     if( slice_type != I ) | |
|       cu_skip_flag[ x0 ][ y0 ] | ae(v) |
|     ... | |
|   } | |
| } | |

Referring to Table 1, 'coding_unit(x0, y0, log 2CbSize)' is a syntax element for specifying a CU (i.e., process block) that is currently to be decoded. Herein, x0 and y0 indexes represent a position of the top-left point of current CU, as an example, is specified to a relative position from the top-left point of a picture. In addition, log 2CbSize represents a size of current CU.

'hybrid_coding_unit_enabled_flag' is a flag that represents whether the CU has the hybrid structure, represents that 'cu_hybrid_flag' is existed when the flag is '1', and represents that 'cu_hybrid_flag' is not existed when the flag is '0'.

'cu_hybrid_flag' is a flag that represents that the current CU is coded in the hybrid CU mode. That is, the flag indicates that the current CU is partitioned in the mixture of the Quad-tree shape and the polygon unit shape. When 'cu_hybrid_flag' is '1', the flag represents that the corresponding CU is an HCU, and in this case, a new syntax may be added. When 'cu_hybrid_flag' is '0', the coding unit syntax of the conventional HEVC is called. Here, when 'cu_hybrid_flag' is not existed, the value is regarded as '0'.

As described above, when the hybrid structure is applied, a decoding apparatus may determine whether the current CU may have the hybrid structure by receiving 'hybrid_coding_unit_enabled_flag' from an encoding apparatus, and may determine whether the current CU is coded in the hybrid CU mode by receiving 'cu_hybrid_flag'.

As another example, as a unit of prediction unit (PU), the hybrid structure described above may be applied. That is, the process block corresponds to the prediction unit, in this case.

Table 2 exemplifies a prediction block partition mode in the HEVC.

TABLE 2

| part_mode | PartMode |
|---|---|
| 0 | PART_2Nx2N |
| 1 | PART_2NxN |
| 2 | PART_Nx2N |
| 3 | PART_NxN |
| 4 | PART_2NxnU |
| 5 | PART_2NxnD |
| 6 | PART_nLx2N |
| 7 | PART_nRx2N |

Referring to Table 2, in the HEVC, eight partition modes PartMode are defined as illustrated in FIG. 4. Here, as described above, PART_2N×2N and PART_N×N may be used in the intra-prediction mode and the inter-prediction mode. And, PART_N×2N, PART_2N×N, PART_nL×2N, PART_nR×2N, PART_2N×nU and PART_2N×nD may be used only in the inter-prediction mode.

According to the prediction mode that is applied to the current CU, a single mode may be determined among the modes defined in Table 2.

In the conventional partition mode PartMode shown in Table 2, the partition mode PartMode of the polygon type is additionally defined, and the PU partition mode shown in Table 3 below may be determined.

TABLE 3

| part_mode | PartMode |
|---|---|
| 0 | PART_2Nx2N |
| 1 | PART_2NxN |
| 2 | PART_Nx2N |
| 3 | PART_NxN |
| 4 | PART_2NxnU |
| 5 | PART_2NxnD |
| 6 | PART_nLx2N |
| 7 | PART_nRx2N |
| 8 | PART_polygon |

Referring to Table 3, in the conventional partition mode PartMode shown in Table 2, the partition mode PartMode of the polygon type may be additionally defined (i.e., PART_polygon).

Herein, the partition mode PART_polygon of the polygon type may be used regardless of whether the current CU is predicted in the intra-prediction mode or the inter-prediction mode.

Table 4 exemplifies the syntax for the hybrid structure of a PU unit.

TABLE 4

| | Descriptor |
|---|---|
| coding_unit( x0, y0, log2CbSize ) { | |
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |

TABLE 4-continued

| | Descriptor |
|---|---|
| ```
else {
  if( slice_type  != I )
    pred_mode_flag
  if( CuPredMode[ x0 ][ y0 ]  !=  MODE_INTRA  ||  log2CbSize  = =
MinCbLog2SizeY )
    part_mode
  if( CuPredMode[ x0 ][ y0 ]  = =  MODE_INTRA ) {
    ...
  } else {
    if( PartMode  = =  PART_2Nx2N )
      prediction_unit( x0, y0, nCbS, nCbS )
    else if( PartMode  = =  PART_2NxN ) {
      prediction_unit( x0, y0, nCbS, nCbS / 2 )
      prediction_unit( x0, y0 + ( nCbS / 2 ), nCbS, nCbS / 2 )
    } else if( PartMode  = =  PART_Nx2N ) {
      prediction_unit( x0, y0, nCbS / 2, nCbS )
      prediction_unit( x0 + ( nCbS / 2 ), y0, nCbS / 2, nCbS )
    } else if( PartMode  = =  PART_2NxnU ) {
      prediction_unit( x0, y0, nCbS, nCbS / 4 )
      prediction_unit( x0, y0 + ( nCbS / 4 ), nCbS, nCbS * 3 / 4 )
    } else if( PartMode  = =  PART_2NxnD ) {
      prediction_unit( x0, y0, nCbS, nCbS * 3 / 4 )
      prediction_unit( x0, y0 + ( nCbS * 3 / 4 ), nCbS, nCbS / 4 )
    } else if( PartMode  = =  PART_nLx2N ) {
      prediction_unit( x0, y0, nCbS / 4, nCbS )
      prediction_unit( x0 + ( nCbS / 4 ), y0, nCbS * 3 / 4, nCbS )
    } else if( PartMode  = =  PART_nRx2N ) {
      prediction_unit( x0, y0, nCbS * 3 / 4, nCbS )
      prediction_unit( x0 + ( nCbS * 3 / 4 ), y0, nCbS / 4, nCbS )
    } else if( PartMode  = =  PART_NxN ) {
      prediction_unit( x0, y0, nCbS / 2, nCbS / 2 )
      prediction_unit( x0 + ( nCbS / 2 ), y0, nCbS / 2, nCbS / 2 )
      prediction_unit( x0, y0 + ( nCbS / 2 ), nCbS / 2, nCbS / 2 )
      prediction_unit( x0 + ( nCbS / 2 ), y0 + ( nCbS / 2 ), nCbS / 2, nCbS / 2 )
    } else { /* PART_polygon */
      polygon_prediction_unit( )
    }
  }
  if( !pcm_flag[ x0 ][ y0 ] ) {
    if( CuPredMode[ x0 ][ y0 ]  !=  MODE_INTRA  &&
      !( PartMode  = =  PART_2Nx2N  &&  merge_flag[ x0 ][y0 ] ) )
      rqt_root_cbf
    if( rqt_root_cbf ) {
      MaxTrafoDepth = ( CuPredMode[ x0 ][ y0 ]  = =  MODE_INTRA
?
                        ( max_transform_hierarchy_depth_intra  +
IntraSplitFlag ) :
                        max_transform_hierarchy_depth_inter )
      transform_tree( x0, y0, x0, y0, log2CbSize, 0, 0 )
    }
  }
}
``` | ae(v)<br><br>ae(v)<br><br><br><br><br><br><br><br><br><br><br><br><br><br><br><br><br><br><br><br><br><br><br><br><br><br><br><br><br><br><br><br>ae(v) |

Referring to Table 4, when calling the PU syntax in the conventional CU syntax, the PU (i.e., PART_polygon) of the polygon type may be additionally called.

A decoder calls the partition mode part_mode when the prediction mode of the current CU is not the intra-mode or the size of the current CU is the minimum CU (CuPredMode [x0][y0] !=MODE_INTRA||log 2CbSize==MinCb Log 2SizeY).

'part_mode' specifies the partition mode of the current CU as shown in Table 3. The meaning of part_mode is determined based on the prediction mode 'CuPredMode[x0] [y0]' of the current CU.

As such, the decoder may determine which mode the corresponding process block is partitioned by calling the partition mode part_mode information received from an encoder.

Table 4 exemplifies the case that the syntax element 'polygon_prediction_unit( )' that calls the PU of the polygon type is added when the CU prediction mode is not the intra-mode, that is, the inter-mode (CuPredMode[x0] [y0]==MODE_INTER).

That is, when the PU of the polygon type is selected, the syntax element 'polygon_prediction_unit ( )' that calls the PU of the polygon type that performs different function from the conventional prediction_unit( ) syntax is added, and the prediction of the prediction block that has the polygon structure is performed.

Meanwhile, in the example described above, although the example is described that the block mode and the polygon unit mode are determined as the process block unit (e.g., coding unit or prediction unit, etc.), the block mode and the polygon unit mode may also be determined as the process block unit of the maximum size.

When the block mode is applied to a specific maximum process block, the corresponding maximum process block may be repeatedly partitioned in the Quad-tree shape, but the lower level process blocks are not partitioned in the polygon unit shape.

On the contrary, when the polygon unit mode is applied to a specific maximum process block, the corresponding maximum process block may be partitioned only in the polygon unit shape.

Meanwhile, when the process block is partitioned into the polygon units with the polygon mode being applied, the position information of the polygon vertex that forms the polygon unit should be transmitted to the decoder. This will be described by reference to the following drawing.

FIG. 11 is a diagram for describing a coordinate of a polygon unit according to an embodiment of the present invention.

Referring to FIG. 11, a decoder may receive the horizontal/vertical coordinate of a top-left point P1 among the vertex of a process block and the size information of the process block from an encoder, and may specify the position of the remaining vertexes P3, P7 and P9 of the process block based on the received information.

In addition, other position information of the points P5, P2, P4, P6 and P8 of which positions are changeably determined should be transmitted to the decoder.

In FIG. 11, 'center_pos_x' and 'center_pos_y' represent the horizontal coordinate and the vertical coordinate of the point that is located inside the process block, respectively. And, 'upper_pos_x' represents the horizontal coordinate of the point that is located in the upper side of the process block. 'right_pos_y' represents the vertical coordinate of the point that is located in the right side of the process block. 'down_pos_x' represents the horizontal coordinate of the point that is located in the lower side of the process block. 'left_pos_y' represents the vertical coordinate of the point that is located in the left side of the process block.

Here, the position information of the polygon vertex that forms the polygon unit may be represented by a relative displacement based on the coordinate of the top-left point of the process block to which the corresponding polygon unit is belonged.

Here, the position information of the polygon vertex that forms the polygon unit may be represented by a relative displacement based on the coordinate of the center point of the process block to which the corresponding polygon unit is belonged.

Such a 'displacement' means the variation of the position from a reference point, and may be expressed by the difference value of the horizontal axis and/or the vertical axis or expressed by the distance from the center point and the angle (assuming the angle of the vertical axis across the center point to be 0°/360°).

Meanwhile, as shown in the example of FIG. 8 above, when a polygon unit is merged to an adjacent polygon unit, it is permissible that a part of the position information of the polygon vertex is not transmitted to the decoder. For example, in the case of FIG. 8(a), the position information of P6 that is located in the right side of the process block and P8 that is located in the lower side of the process block may not be transmitted to the decoder.

The decoder may derive the vertical coordinate of the point that is located in the upper side and the lower side of the process block and the horizontal coordinate of the left side and the right side of the process block from the coordinate of the top-left point P1 among the vertexes of the process block and the size information of the process block.

Table 5 exemplifies the syntax for the vertex coordinate of a polygon unit.

TABLE 5

| if (cu_polygon_flag) { | Descriptor |
| --- | --- |
| center_pos_x | ae(v) |
| center_pos_y | ae(v) |
| upper_pos_x | ae(v) |
| right_pos_y | ae(v) |
| down_pos_x | ae(v) |
| left_pos_y | |
| } | |

Referring to Table 5, 'cu_polygon_flag' is a flag indicating that the current CU is coded in the polygon mode. When 'cu_polygon_flag' is '1', the syntax elements 'center_pos_x', 'center_pos_y', 'upper_pos_x', 'right_pos_y', 'down_pos_x' and left_pos_y' that represent the position of the polygon vertexes are called.

As described above, when a polygon unit is merged to an adjacent polygon unit, it is permissible that a part of the position information of the polygon vertex is not transmitted to the decoder. In this case, some syntax elements in the above Table 5 may be omitted.

By receiving the position information of the polygon vertexes together with the coordinate of the top-left point of the process block and the size information of the process block from the encoder, the decoder may determine which partition structure of the polygon unit each process block is partitioned in.

Meanwhile, in FIG. 5 to FIG. 11 above, although the method of partitioning the process block into the polygon units is described by determining the point located inside a single process block and the point located in each of the sides, a single process block may be partitioned in a type that is selected among the predetermined partition types (or patterns) of the polygon unit. This will be described by reference to the following drawing.

FIG. 12 is a diagram for describing a coding method based on a polygon unit according to an embodiment of the present invention.

Referring to FIG. 12, an encoder partitions an input image by the unit of process block (step, S1201). Herein, the process block means the block of a square shape.

The encoder select one polygon unit partition type among the predetermined polygon unit partition types (step, S1202). The polygon unit partition type will be described below in more detail.

The encoder generates a polygon unit by partitioning the process block that is currently to be coded into the polygon units in the polygon unit partition type selected in step, S1202 (step, S1203).

And, the encoder performs coding by the unit of polygon unit.

Hereinafter, the polygon unit partition type will be described.

FIG. 13 is a diagram illustrating a polygon unit partition type according to an embodiment of the present invention.

Similar to the partition type of the prediction block (PU) that is predefined in the HEVC described in FIG. 4 above, the partition type of a polygon unit may be predetermined.

Referring to FIG. 13, the type PART_nRD that is partitioned into two polygon units by the segment connecting the upper right vertex and the lower left vertex of the process block, the type PART_nLD that is partitioned into two polygon units by the segment connecting the top-left vertex and the lower right vertex of the process block and the type RART_nCR that is partitioned into four polygon units by using two vertexes among four vertexes and the center point of the process block may be predefined.

However, the polygon unit partition type illustrated in FIG. 13 is just an example, but the present invention is not limited thereto.

Table 6 exemplifies the polygon unit partition type.

TABLE 6

| CuPredMode[x0][y0] | part_mode | IntraSplitFlag | PartMode |
| --- | --- | --- | --- |
| MODE_INTRA | 0 | 0 | PART_2Nx2N |
| | 1 | 1 | PART_NxN |
| MODE_INTER | 0 | 0 | PART_2Nx2N |
| | 1 | 0 | PART_2NxN |
| | 2 | 0 | PART_Nx2N |
| | 3 | 0 | PART_NxN |
| | 4 | 0 | PART_2NxnU |
| | 5 | 0 | PART_2NxnD |
| | 6 | 0 | PART_nLx2N |
| | 7 | 0 | PART_nRx2N |
| | 8 | 0 | PART_nRD |
| | 9 | 0 | PART_nLD |
| | 10 | 0 | PART_nCR |

Referring to Table 6, the partition types (PART_nRD, PART_nLD and PART_nCR) of the polygon unit may be defined in addition to the conventional partition mode PartMode shown in Table 2.

Table 6 exemplifies the case that the partition types (PART_nRD, PART_nLD and PART_nCR) of the polygon unit are added in the inter-prediction mode, but the partition types of the polygon unit may also be added in the intra-prediction mode.

Compared with Table 3 above, in Table 3 above is defined the partition mode of the polygon type only, and may be indicated whether the current process block is partitioned into the polygon units. That is, the information on which shape the polygon unit partition structure is constructed is not included, so that a decoder additionally requires the information on the polygon vertex.

On the contrary, in Table 6, the decoder may determine which shape of the polygon unit of the current process block is partitioned on which shape of the polygon unit may be determined in the decoder from the partition type of the polygon unit. Accordingly, in this case, an encoder may not transmit the coordinate information (refer to FIG. 11) on the polygon vertex to the decoder.

Table 7 exemplifies the syntax for the polygon unit partition type.

TABLE 7

| | Descriptor |
| --- | --- |
| coding_unit( x0, y0, log2CbSize ) { | |
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( slice_type != I ) | |
|       pred_mode_flag | ae(v) |
|     if( CuPredMode[ x0 ][ y0 ] != MODE_INTRA || log2CbSize == MinCbLog2SizeY ) | |
|       part_mode | ae(v) |
|     if( CuPredMode[ x0 ][ y0 ] == MODE_INTRA ) { | |
|       ... | |
|     } else { | |
|       if( PartMode == PART_2Nx2N ) | |
|         prediction_unit( x0, y0, nCbS, nCbS ) | |
|       else if( PartMode == PART_2NxN ) { | |
|         prediction_unit( x0, y0, nCbS, nCbS / 2 ) | |
|         prediction_unit( x0, y0 + ( nCbS / 2 ), nCbS, nCbS / 2 ) | |
|       } else if( PartMode == PART_Nx2N ) { | |
|         prediction_unit( x0, y0, nCbS / 2, nCbS ) | |
|         prediction_unit( x0 + ( nCbS / 2 ), y0, nCbS / 2, nCbS ) | |
|       } else if( PartMode == PART_2NxnU ) { | |
|         prediction_unit( x0, y0, nCbS, nCbS / 4 ) | |
|         prediction_unit( x0, y0 + ( nCbS / 4 ), nCbS, nCbS * 3 / 4 ) | |
|       } else if( PartMode == PART_2NxnD ) { | |
|         prediction_unit( x0, y0, nCbS, nCbS * 3 / 4 ) | |
|         prediction_unit( x0, y0 + ( nCbS * 3 / 4 ), nCbS, nCbS / 4 ) | |
|       } else if( PartMode == PART_nLx2N ) { | |
|         prediction_unit( x0, y0, nCbS / 4, nCbS ) | |
|         prediction_unit( x0 + ( nCbS / 4 ), y0, nCbS * 3 / 4, nCbS ) | |
|       } else if( PartMode == PART_nRx2N ) { | |
|         prediction_unit( x0, y0, nCbS * 3 / 4, nCbS ) | |
|         prediction_unit( x0 + ( nCbS * 3 / 4 ), y0, nCbS / 4, nCbS ) | |
|       } else if( PartMode == PART_NxN ) { | |
|         prediction_unit( x0, y0, nCbS / 2, nCbS / 2 ) | |
|         prediction_unit( x0 + ( nCbS / 2 ), y0, nCbS / 2, nCbS / 2 ) | |
|         prediction_unit( x0, y0 + ( nCbS / 2 ), nCbS / 2, nCbS / 2 ) | |
|       prediction_unit( x0 + ( nCbS / 2 ), y0 + ( nCbS / 2 ), nCbS / 2, nCbS / 2 ) | |
|       } else if( PartMode == PART_nRD ) { | |
|         polygon_prediction_unit( ) | |
|       } else if( PartMode == PART_nLD ) { | |
|         polygon_prediction_unit( ) | |
|       } else { | |
|         polygon_prediction_unit( ) | |
|       } | |
|     } | |
|   } | |
| } | |

TABLE 7-continued

| | Descriptor |
|---|---|
| ```
if( !pcm_flag[ x0 ][ y0 ] ) {
    if( CuPredMode[ x0 ][ y0 ] != MODE_INTRA &&
        !( PartMode  ==  PART_2Nx2N  &&  merge_flag[ x0 ][ y0 ] ) )
        rqt_root_cbf
    if( rqt_root_cbf ) {
        MaxTrafoDepth = ( CuPredMode[ x0 ][ y0 ] = = MODE_INTRA ?
                        (    max_transform_hierarchy_depth_intra    +
IntraSplitFlag ) :
                        max_transform_hierarchy_depth_inter )
        transform_tree( x0, y0, x0, y0, log2CbSize, 0, 0 )
    }
  }
 }
}
``` | ae(v) |

Referring to Table 7, when calling the PU syntax in the conventional CU syntax, the partition types (PART_nRD, PART_nLD and PART_nCR) of the polygon unit may be additionally called.

A decoder calls the partition mode part_mode when the prediction mode of the current CU is not the intra-mode or the size of the current CU is the minimum CU (CuPredMode [x0][y0] !=MODE_INTRA∥log 2CbSize==MinCbLog 2SizeY).

'part_mode' specifies the partition mode of the current CU as shown in Table 6. The meaning of part_mode is determined based on the prediction mode 'CuPredMode[x0][y0]' of the current CU.

As such, the decoder may determine in which polygon unit partition type the corresponding process block is partitioned by calling the partition mode part_mode information received from an encoder.

Table 7 exemplifies the case that the syntax element 'polygon_prediction_unit( )' that calls the partition types (PART_nRD, PART_nLD and PART_nCR) of the polygon unit is added when the CU prediction mode is not the intra-mode, that is, the inter-mode (CuPredMode[x0][y0]==MODE_INTER).

That is, when a type is selected among the partition types (PART_nRD, PART_nLD and PART_nCR) of the polygon types, the syntax element 'polygon_prediction_unit ( )' that calls the PU of the partition type of the selected polygon unit is added, and the prediction of the prediction block that has the polygon structure of the selected type is performed.

FIG. 14 illustrates a schematic inner block diagram of a picture partitioning unit that performs a polygon unit partition according to an embodiment of the present invention.

Referring to FIG. 14, a picture partitioning unit 1400 implements the function, process and/or method proposed in FIG. 3 to FIG. 13 above. Particularly, the picture partitioning unit 1400 may include a block partitioning unit 1401 and a polygon unit partitioning unit 1402.

Herein, the picture partitioning unit 1400 may correspond to the picture partitioning unit 110 shown in FIG. 1.

The block partitioning unit 1401 partitions the input image that is inputted to an encoder by a unit of process block. And, the input image is outputted by a unit of process block.

The polygon unit partitioning unit 1402 receives the input image from the block partitioning unit 1401 by a unit of process block, and partitions the process block that is currently to be coded by a unit of polygon unit.

Here, the polygon unit partitioning unit 1402 may partition the current process block into at least one polygon unit by determining the position of at least one point in the process block that is currently to be coded and in each side of the corresponding process block, and by using at least two points among the vertexes of the process block currently to be coded and the point determined in each side and the point determined in the current process block.

In addition, the polygon unit partitioning unit 1402 may select a single polygon unit partition type among predetermined polygon unit partition types, and may partition the process block currently to be coded into polygon unit in the selected polygon unit partition type.

Meanwhile, as described above, when a process block is partitioned into the polygon unit, the position information of the determined point inside the process block and the point determined in each side or the polygon unit partition type information should be forwarded to a decoder.

When the polygon unit partition type is not predetermined, the position information of the determined point inside the process block and the point determined in each side should be forwarded to the decoder. However, a method for decreasing the amount of information is required since the amount of information is too big to forward the position information for all polygon vertexes.

Accordingly, the present invention proposes a method for predicting the position information of the vertexes that form a polygon unit from the adjacent process block that is decoded previously or other image (or picture). Accordingly, the case that the polygon unit is not predetermined is assumed in the present invention below.

FIG. 15 is a diagram illustrating a decoding method based on a polygon unit according to an embodiment of the present invention.

Referring to FIG. 15, a decoder receives a residual value for the vertex of the polygon unit of the process block that is currently to be decoded from an encoder (step, S1501).

Herein, the residual value for the vertex of the polygon unit of the process block that is currently to be decoded means a difference value between a prediction value for the vertex of the polygon unit of an adjacent process block that has been decoded previously or the current process block determined from other picture and a position of the vertex of the polygon unit of the current process block.

The residual value for a vertex of the polygon unit of the process block that is currently to be decoded will be described in more detail below.

The decoder determines a prediction value for the vertex of the polygon unit of the process block that is currently to be decoded (step, S1502). Herein, the prediction value for the vertex of the polygon unit of the process block that is currently to be decoded may be determined from the adjacent process block that is decoded previously or other picture in temporal direction.

The prediction value for the vertex of the polygon unit of the process block that is currently to be decoded will be described in more detail below.

The decoder derives a position of the vertex of the polygon unit of the process block to be decoded currently from the residual value and the prediction value for the vertex of the polygon unit of the process block that is currently to be decoded (step, S1503).

As such, by deriving the position of the vertex of the polygon unit of the process block to be decoded currently, the decoder may determine the polygon unit partition structure of the current process block. And, the decoder performs decoding by a unit of polygon based on the polygon unit partition structure of the current process block which is determined.

FIG. 16 is a diagram illustrating a prediction method of a polygon unit partition structure according to an embodiment of the present invention.

Since the probability is high that the same object in the input image belongs to the current process block and the adjacent process block, the polygon units generated within each of the process block may have continuity with each other.

Accordingly, the position information of the polygon unit vertex located in the adjacent side of the adjacent process block may be used for predicting the position information of the vertex of the current polygon unit. That is, for the vertex of the polygon unit located in a left (upper) side of the current process block, the position information of the vertex of the polygon unit located in the right (lower) side of an adjacent process block adjacent to the left (upper) of the current process block may be used as a prediction value.

Referring to FIG. 16, since each of the process blocks are sequentially encoded/decoded according to the raster scan order, the position information of the vertex of the polygon unit that belongs to the process block adjacent to the left of the current process block is already determined.

An encoder determines the position (i.e., coordinate or displacement) of a vertex 1611 of the polygon unit located in the right side of the process block adjacent to the left that has been decoded previously as a prediction value. And, the encoder transmits the residual value Δ between the position prediction value of the vertex of the determined polygon unit and the vertex 1601 position of the polygon unit located in the left side of the current process block to a decoder.

Herein, since the residual value is a residual value compared with the prediction value in the process block adjacent to the left side, the residual value means a difference value in the vertical axis direction. On the contrary, the residual value with the prediction value in the process block adjacent to the upper side means a difference value in the horizontal axis direction.

The decoder receives the residual value Δ between the position prediction value of the vertex of the polygon unit of the current process block and the vertex 1601 position of the polygon unit located in the left side of the current process block. And, the decoder determines the position information of the vertex 1611 of the polygon unit located in the right side of the process block adjacent to the left side that is decoded previously as a prediction value. And, the decoder derives the position of the vertex 1601 of the polygon unit of the current process block based on the received residual value Δ and the position prediction value of the vertex of the polygon unit which is determined.

In FIG. 16, only the method is exemplified for predicting the position information of the vertex 1601 of the polygon unit that is located in the left side of the current process block. However, by using the same method above, the vertex of the polygon unit that is located in the bottom side of the process block adjacent to the upper side may be used in order to predict the position information on the vertex 1602 of the polygon unit that is located in the upper side of the current process block.

In addition, in order to predict the position information on the vertex of the polygon unit that is located within the current process block and on the vertex of the polygon unit that is located in the right (lower) side of the process block, the vertex of the polygon unit of the adjacent process block is unable to be used. Accordingly, the encoder may transmit the displacement value information based on a coordinate value or a center point (or a point located within the process block).

As such, when the decoder acquires the position information of the vertexes of all polygon units within the current process block, the decoder may derive the partition structure of the polygon unit in the current process block.

Table 8 exemplifies the decoding syntax for the prediction process of a polygon unit partition structure.

TABLE 8

| | Descriptor |
|---|---|
| if (cu_polygon_flag) { | |
|   center_pos_x | ae(v) |
|   center_pos_y | ae(v) |
|   if(upper_cu_polygon_available) { | |
|     upper_pos_x_off | ae(v) |
|     upper_pos_x = upper_cu_down_pos_x + upper_pos_x_off | |
|   } else { | |
|     upper_pos_x | ae(v) |
|   } | |
|   right_pos_y | ae(v) |
|   down_pos_x | ae(v) |
|   if(left_cu_polygon_available) { | |
|     left_pos_y_off | ae(v) |
|     left_pos_y = left_cu_right_pox_y + left_pos_y_off | |
|   } else { | |
|     left_pos_y | ae(v) |
|   } | |
| } | |

Referring to Table 8, for the position (left_pos_y for a left side and upper_pos_x for an upper side) of the vertex of the polygon unit that is located in the left side and the upper side of the current CU (i.e., process block), the process which is decoding the displacement (i.e., difference value) only for the corresponding position is exemplified by using the vertex position in the adjacent CU as a prediction value (predictor).

In Table 8, 'upper_pos_x_off' means the position difference value between the vertex of the polygon unit that is located in the upper side of the current CU and the polygon vertex that is located in the bottom side of the CU adjacent to the upper side with the current CU. Further, 'left_pos_y_off' means the position difference value between the vertex of the polygon unit that is located in the left side of the current CU and the polygon vertex that is located in the right side of the CU adjacent to the left side with the current CU.

'upper_cu_down_pos_x' means the position value with the current CU and the polygon vertex that is located in the bottom side of the CU adjacent to the upper side. In addition, 'left_cu_right_pox_y' means the position value with the current CU and the polygon vertex that is located in the right side of the CU adjacent to the left side.

For the upper side, it is checked that the vertex position of the polygon unit in the bottom side that is adjacent to the upper side is available (upper_cu_polygon_available). For example, since there is no CU adjacent to the upper side that has been previously decoded for the CU located in the top-left end of an image, the vertex position of the polygon unit of the bottom side of the CU adjacent to the upper side is unable to be used.

And, using the vertex position upper_cu_down_pos_x of the polygon unit in the bottom side of the CU adjacent to the upper side as a prediction value (predictor), by adding a displacement (i.e., a difference value; upper_pos_x_off), the vertex position value upper_pos_x of the polygon unit in the upper side of the current CU is derived.

Accordingly, since only the difference value upper_pos_x_off from the vertex of the polygon unit that is located in the adjacent side of the adjacent process block, not the vertex position value of the polygon unit itself, is coded and decoded, the amount of information may be efficiently decreased.

The coding/decoding method for the polygon partition vertex position left_pos_y in the left side may be performed in the same way above.

Meanwhile, as described above, when the partition structure of the Quad-tree shape (i.e., block mode) and the partition structure of the polygon unit shape (i.e., polygon unit mode) are mixed and used, a current process block may be adjacent to a plurality of process blocks, not to a single process block in the left or upper side. For example, whereas the current process block has 2N×2N size, the process block adjacent to the left side may be partitioned in the Quad-tree shape once more and may be two process blocks of N×N size. In this case, the number of vertexes of the polygon unit for each of the process blocks that are determined to be in the side adjacent to with each other may be different.

In addition, even when the current process block has the same size as the adjacent process block, more vertexes of the polygon unit may be determined in the adjacent process block than in the current process block. That is, the number of vertexes of the polygon unit for each of the process blocks that are determined to be in the side adjacent to with each other may be different.

A method for predicting a polygon unit partition structure in such a case will be described by reference to the following drawing.

FIG. 17 is a diagram illustrating a prediction method of a polygon unit partition structure according to an embodiment of the present invention.

FIG. 17 exemplifies the case that the polygon unit partition structure of an adjacent process block is further subdivided compared to the polygon unit partition structure of the current process block.

In this case, the prediction value that is determined from the position information of the vertexes of a plurality of polygon units that is located in an adjacent side of an adjacent process block may be used for predicting the position information of the vertex of the current polygon unit. That is, for the vertex of the polygon unit that is located in the left (upper) side of the current process block, the prediction value that is determined from the vertex position information of a plurality of polygon units located in the right (lower) side of a process block adjacent to the left (upper) side of the current process block.

1) The position information of the polygon unit that is selected among the vertexes of a plurality of polygon units that is located in an adjacent side of an adjacent process block may be used for a prediction value. And, the selected polygon unit vertex may be indicated by an indicator. That is, an encoder may transmit the index information of the selected polygon unit vertex to a decoder.

Referring to FIG. 7, the encoder determines the position information of a vertex (e.g., 1711) of a polygon unit among the vertexes 1711, 1712 and 1713 of a plurality of polygon unit that are located in the right side of a process block adjacent to the left side which has been previously decoded as a prediction value. And, the encoder transmits the residual value Δ between the position prediction value of the vertex of the determined polygon unit and the vertex 1701 of the polygon unit that is located in the left side of the current prediction block, and the index information of the selected vertex (e.g., 1711) of the polygon unit to the decoder.

Herein, since the residual value is a residual value from the prediction value in the process block adjacent to the left side, the residual value means a difference value in the vertical axis direction. On the contrary, the residual value from the prediction value in the process block adjacent to the upper side means a difference value in the horizontal axis direction.

The decoder receives the residual value Δ between the prediction value and the vertex 1701 of the polygon unit that is located in the left side of the current prediction block, and the index information of the selected polygon unit (e.g., 1711) from the encoder. And, the decoder determines the position information of the vertex (e.g., 1711) of the selected polygon unit in the process block adjacent to the left side using the received index information as a prediction value. And, the decoder derives the position of the vertex 1701 of the polygon unit of the current process block based on the received residual value Δ and the determined position prediction value of the vertex of the polygon unit.

2) The position information of the polygon unit vertex that is located in an adjacent side of an adjacent process block may be transformed to a displacement value based on a center point, and a representative value (e.g., average value or median value) may be used for the prediction value from the displacement values.

Herein, the center point designates a center in an adjacent side (the left side of the current process block or the right side of the left process block in FIG. 17) between adjacent process blocks.

Referring to FIG. 17, the encoder determines the representative value (e.g., average value or median value) for the displacements of the vertexes 1711, 1712 and 1713 of a plurality of polygon unit that are located in the right side of the process block adjacent to the left side which has been previously decoded as a prediction value. And, the encoder transmits the residual value Δ between the position prediction value of the vertex of the determined polygon unit and the vertex 1701 of the polygon unit that is located in the left side of the current prediction block to the decoder.

The decoder receives the residual value Δ between the prediction value and the vertex 1701 of the polygon unit that is located in the left side of the current prediction block. And, the decoder determines the representative value (e.g., average value or median value) for the displacements of the vertexes 1711, 1712 and 1713 of a plurality of polygon unit within a process block adjacent to the left side as a prediction value. And, the decoder derives the position of the vertex 1711 of the polygon unit of the current process block based on the received residual value Δ and the determined position prediction value of the vertex of the polygon unit.

3) The position information of the polygon unit vertex that is located in the left (upper) side of the current process block and a plurality of polygon unit vertexes that are located in an adjacent side of an adjacent process block is transformed into a displacement value based on a center point.

Herein, the center point designates a center in an adjacent side (the left side of the current process block or the right side of the left process block in FIG. 17) between adjacent process blocks.

And, a prediction value is a point, which is the smallest in difference of the displacement absolute values with the polygon unit vertex that is located in the left (upper) side of the current process block among a plurality of polygon unit vertexes that is located in an adjacent side of an adjacent process block.

Referring to FIG. 17, the encoder determines the point (e.g., 1711) of which difference of the displacement absolute values with the polygon unit vertex of the left side of the current process block among the vertexes 1711, 1712 and 1713 of a plurality of polygon unit that are located in the right side of a process block adjacent to the left side which has been previously decoded as a prediction value. And, the encoder transmits the residual value Δ between the determined position prediction value and the vertex 1701 of the polygon unit in the left side of the current prediction block, and the index information of the selected vertex (e.g., 1711) of the polygon unit as the decoder.

The decoder receives the residual value Δ between the prediction value and the vertex 1701 of the polygon unit that is located in the left side of the current prediction block, and the index information of the selected polygon unit (e.g., 1711) from the encoder. And, the decoder determines the position information of the vertex (e.g., 1711) of the selected polygon unit in the process block adjacent to the left side using the received index information as a prediction value. And, the decoder derives the position of the vertex 1711 of the polygon unit of the current process block based on the received residual value Δ and the determined position prediction value of the vertex of the polygon unit.

In FIG. 17, only the method is exemplified for predicting the position information of the vertex 1701 of the polygon unit that is located in the left side of the current process block. However, by using the same method above, the vertex of the polygon unit that is located in the bottom side of the process block adjacent to the upper side may be used in order to predict the position information on the vertex of the polygon unit that is located in the upper side of the current process block.

In addition, in order to predict the position information on the vertex of the polygon unit that is located within the current process block and on the vertex of the polygon unit that is located in the right (lower) side of the process block, the vertex of the polygon unit of the adjacent process block is unable to be used. Accordingly, the encoder may transmit the displacement value information based on a coordinate value or a center point (or a point located within the process block).

As such, when the decoder acquires the position information of the vertexes of all polygon units within the current process block, the decoder may derive the partition structure of the polygon unit in the current process block.

Table 9 exemplifies the decoding syntax for a prediction process of a polygon unit partition structure.

TABLE 9

|  | Descriptor |
|---|---|
| if (cu_polygon_flag) { | |
|   center_pos_x | ae(v) |
|   center_pos_y | ae(v) |
|   if(upper_cu_polygon_available) { | |
|     if(num_of_upper_pos_x_pred_cand > 1) { | |
|       upper_pos_x_pred_idx | ae(v) |
|     } else { | |
|       upper_pos_x_pred_idx = 0 | |
|     } | |
|     upper_pos_x_off | ae(v) |
|     upper_pos_x = upper_pos_x_pred_cand | |
|     [upper_pos_x_pred_idx] + upper_pos_x_off | |
|   } else { | |
|     upper_pos_x | ae(v) |
|   } | |
|   right_pos_y | ae(v) |
|   down_pos_x | ae(v) |
|   if(left_cu_polygon_available) { | |
|     if(num_of_left_pos_y_pred_cand > 1) { | |
|       left_pos_y_pred_idx | |
|     } else { | |
|       left_pos_y_pred_idx = 0 | |
|     } | |
|     left_pos_y_off | ae(v) |
|     left_pos_y = left_pos_y_pred_cand | |
|     [left_pos_y_pred_idx] + left_pos_y_off | |
|   } else { | |
|     left_pos_y | ae(v) |
|   } | |
| } | |

Referring to Table 9, Table 9 exemplifies a process of determining a prediction value by decoding an index for designating one among candidates, when there are several prediction value (predictor) candidates for a polygon unit vertex position.

In Table 9, 'upper_pos_x_off' means the position difference value between the vertex of the polygon unit that is located in the upper side of the current CU (i.e., process block) and the polygon vertex that is located in the bottom side of the CU adjacent to the upper side with the current CU. Further, 'left_pos_y_off' means the position difference value between the vertex of the polygon unit that is located in the left side of the current CU and the polygon vertex that is located in the right side of the CU adjacent to the left side with the current CU.

In addition, 'upper_pos_x_pred_idx' is an index for predicting the vertex position of the polygon in the upper side of the current CU, and left_pos_y_pred_idx' is an index for predicting the vertex position of the polygon in the left side of the current CU.

In this case, when there is one available prediction value (predictor) candidate, the corresponding index may not be signaled.

Furthermore, in the case that only one candidate is left by obtaining the average or a median value with several prediction predictors, it is not required to send an index (Table 3).

For the upper side, it is checked that the vertex position of the polygon unit in the bottom side that is adjacent to the upper side is available (upper_cu_polygon_available). For example, since there is no CU adjacent to the upper side that is previously decoded for the CU located in the top-left end of an image, the vertex position of the polygon unit of the bottom side of the CU adjacent to the upper side is unable to be used.

And, when there is a plurality of prediction value candidates within a process block adjacent to the upper side (num_of_upper_pos_x_pred_cand>1), 'upper_pos_x_pred_idx' value is determined, and otherwise, 'upper_pos_x_pred_idx' is set to zero.

And, using the polygon vertex position (upper_pos_x_pred_cand [upper_pos_x_pred_idx]) in the bottom side of the CU adjacent to the upper side that is indicated by 'upper_pos_x_pred_idx' as a prediction value (predictor), the vertex position value upper_pos_x is derived by adding a displacement (i.e., difference value) upper_pos_x_off.

The coding/decoding method for the polygon partition vertex position left_pos_y in the left side may be performed in the same way above.

Meanwhile, the size of the current process block may be smaller than the size of the process block adjacent to the left side or the upper side. For example, whereas the current process block has N×N size, the process block adjacent to the left side may have 2N×2N size. In this case, the number of vertexes of the polygon unit for each of the process blocks that are determined to be in an adjacent side with each other may be different.

In addition, even when the current process block has the same size as the adjacent process block, more vertexes of the polygon unit may be determined in the adjacent process block than in the current process block. That is, the number of vertexes of the polygon unit for each of the process blocks that are determined to be in an adjacent side with each other may be different.

A method for predicting a polygon unit partition structure in such a case will be described by reference to the following drawing.

FIG. 18 is a diagram illustrating a prediction method of a polygon unit partition structure according to an embodiment of the present invention.

FIG. 18 exemplifies the case that the polygon unit partition structure of the current process block is further subdivided than the polygon unit partition structure of an adjacent process block.

In this case, the prediction value that is determined from the position information of the polygon unit vertexes that is located in an adjacent side of an adjacent process block may be used for predicting the position information of the vertex of the current polygon unit. That is, for a part of a plurality of polygon unit vertexes that are located in the left (upper) side of the current process block, the prediction value that is determined from the position information of the polygon unit vertex located in the right (lower) side of a process block adjacent to the left (upper) side is used.

More specifically, each of the vertexes of a plurality of polygon units that are determined in the left (upper) side of the current process block may have an available range of a displacement value (i.e., a range in which a vertex of the polygon unit may be located), and may be predicted only in the case that the polygon unit vertex located in an adjacent side of an adjacent process block is included within the available range of a displacement value.

In other words, the position information of the polygon unit vertex that is located in the left (upper) side of the current process block may be predicted from the polygon unit vertex of the adjacent process block that belongs to the range in which it may be located.

Referring to FIG. 18, it is assumed that the upper end vertex in the left side of the current process block is referred to as 'a', the vertex at the lower end is referred as 'c', and the center point of the left side is referred to as 'b'. Here, each of the polygon unit vertexes 1801 and 1802 located in the left side of the current process block has a range in which it may be located. That is, the polygon unit vertex 1801 may be located between 'a' and 'b', and the polygon unit vertex 1802 may be located between 'b' and 'c'.

Since the polygon unit vertex 1811 that is located in the right side of a process block adjacent to the left side is located between 'a' and 'b', in order to predict the polygon unit vertex 1801 of the current process block, the polygon unit vertex 1811 position of the adjacent process block may be used.

An encoder determines the vertex 1811 of the polygon unit that is located in the right side of the process block adjacent to the left side which has been previously decoded to belong to which an available range (a-b) of a displacement value of a polygon vertex among the left polygon vertexes of the current process block. And, the encoder determines the position information of the vertex 1811 of the polygon unit that is located in the right side of the process block adjacent to the left side which has been previously decoded as the prediction value for the polygon unit vertex 1801 that is located in the corresponding displacement value range (a-b) among the left polygon vertexes of the current process block. And, the encoder transmits the residual value Δ between the determined prediction value and the vertex 1801 of the polygon unit that is located in the corresponding displacement value range (a-b) to a decoder.

Herein, since the residual value is a residual value from the prediction value in the process block adjacent to the left side, the residual value means a difference value in a vertical axis direction. On the contrary, the residual value from the prediction value in the process block adjacent to the upper side means a difference value in a horizontal axis direction.

The decoder receives the residual value Δ between the prediction value and the vertex 1801 of the polygon unit that is located in the left side of the current prediction block from the encoder. And, the decoder determines the position information of the vertex (e.g., 1811) of the selected polygon unit in the process block adjacent to the left side. And, the decoder derives the position of the vertex 1801 of the polygon unit of the current process block based on the received residual value Δ and the determined position prediction value of the vertex of the polygon unit.

On the other hand, the position of the polygon unit vertex 1802 in which the polygon unit vertex of the adjacent process block is not included within the available displacement among the polygon unit vertexes 1801 and 1802 of the current process block may not be predicted using the point of the adjacent process block. Accordingly, the position may be indicated by the displacement value based on the coordinate value or the center point (or a point located in the process block) as described above. Similarly, the position information of the polygon unit vertex that is located within the current process block and the polygon unit vertex that is located in the right (lower) side of the process block may also be indicated by the displacement value based on the coordinate value or the center point (or a point located in the process block).

In FIG. 18, only the method is exemplified for predicting the position information of the vertex 1801 of the polygon unit that is located in the left side of the current process block. However, by using the same method above, the vertex of the polygon unit that is located in the bottom side of the process block adjacent to the upper side may be used in order to predict the position information on the vertex of the polygon unit that is located in the upper side of the current process block.

Table 10 exemplifies the decoding syntax for a prediction process of a polygon unit partition structure.

TABLE 10

| | Descriptor |
|---|---|
| if (cu_polygon_flag) { | |
|   center_pos_x | ae(v) |
|   center_pos_y | ae(v) |
|   if(upper_cu_polygon_available) { | |
|     upper_pos_x_off | ae(v) |
|     upper_pos_x = upper_pos_x_pred + upper_pos_x_off | |
|   } else { | |
|     upper_pos_x | ae(v) |
|   } | |
|   right_pos_y | ae(v) |
|   down_pos_x | ae(v) |
|   if(left_cu_polygon_available) { | |
|     left_pos_y_off | ae(v) |
|     left_pos_y = left_pos_y_pred + left_pos_y_off | |
|   } else { | |
|     left_pos_y | ae(v) |
|   } | |
| } | |

Referring to Table 10, 'upper_pos_x_off' means the position difference value between the vertex of the polygon unit that is located in the upper side of the current CU (i.e., process block) and the polygon vertex that is located in the bottom side of the adjacent CU to the upper side with the current CU. Further, 'left_pos_y_off' means the position difference value between the vertex of the polygon unit that is located in the left side of the current CU and the polygon vertex that is located in the right side of the adjacent CU to the left side with the current CU.

'upper_pos_x_pred' means the position value of the polygon vertex that is located at the bottom side of the CU adjacent to the upper side of the current CU. 'left_pos_y_pred' means the position value of the polygon vertex that is located in the right side of the CU adjacent to the left side of the current CU.

For the upper side, it is checked that the vertex position of the polygon unit in the bottom side that is adjacent to the upper side is available (upper_cu_polygon_available). When the polygon vertex of the bottom side of the CU adjacent to the upper side belongs to the available range of a displacement value of the polygon vertex in the upper side of the current CU, '1' may be indicated. On the contrary, when the polygon vertex of the bottom side of the CU adjacent to the upper side does not belong to the available range of a displacement value of the polygon vertex in the upper side of the current CU, '0' may be indicated.

And, using the polygon vertex position (upper_pos_x_pred) in the bottom side of the CU adjacent to the upper side as a prediction value (predictor), the vertex position value upper_pos_x in the upper side of the current CU is derived by adding a displacement (i.e., difference value) upper_pos_x_off.

The coding/decoding method for the polygon partition vertex position left_pos_y in the left side may be performed in the same way above.

Meanwhile, as described above, when the partition structure of the Quad-tree shape (i.e., block mode) and the partition structure of the polygon unit shape (i.e., polygon unit mode) are mixed and used, the block mode and the polygon unit mode may be determined by a unit of the process block. Even in this case, the partition point of the adjacent process block may be used for predicting the polygon unit vertex within the process block to which the polygon unit mode is applied. This will be described by reference to the following drawing.

FIG. 19 is a diagram illustrating a prediction method of a polygon unit partition structure according to an embodiment of the present invention.

FIG. 19 exemplifies the case that the polygon unit mode is applied to the current process block, and the block mode is applied to the process block adjacent to the left side.

In this case, by assuming that an adjacent process block is partitioned in the polygon unit mode even though the block mode is applied to the adjacent process block, the description above by reference to FIG. 16 to FIG. 18 may be applied in the same way.

In other words, when the number of block partition point in an adjacent side of an adjacent process block in the left (upper) side is the same as the number of point that is located in an adjacent side of the current process block, the method according to the example of FIG. 16 may be applied in the same way. Similarly, when the number of block partition point in an adjacent side of an adjacent process block in the left (upper) side is more than the number of point that is located in an adjacent side of the current process block, the method according to the example of FIG. 17 may be applied in the same way. In addition, when the number of block partition point in an adjacent side of an adjacent process block in the left (upper) side is less than the number of point that is located in an adjacent side of the current process block, the method according to the example of FIG. 18 may be applied in the same way.

That is, when the adjacent process block is partitioned in the polygon mode, and the vertex of the polygon unit and the adjacent process block are partitioned in the block mode in FIG. 16 to FIG. 18 above, the block partition point plays the same role in that the block partition point distinguishes all process blocks into subdivided units (i.e., polygon unit or lower level block). Accordingly, the 'vertex of the polygon unit' and the 'block partition point' mentioned in this specification may be commonly referred to as a 'partition point'.

Meanwhile, so far the method is described for predicting the polygon unit partition structure of a current process block spatially from an adjacent process block, but the polygon unit partition structure of a current process block may be temporally predicted. In this specification, the block that is temporally used as the prediction information of the polygon unit partition structure is referred to as a 'prediction block'. This will be described by reference to the following drawing.

FIG. 20 is a diagram illustrating a prediction method of a polygon unit partition structure according to an embodiment of the present invention.

In FIG. 20, it is assumed that the picture including a current process block 2002 is picture order count (POC) 2 and the picture including a prediction block 2001 is POC 1.

Referring to FIG. 20, in order to determine the polygon unit partition structure for the current process block 2002, the polygon unit partition structure information may be used as a prediction value for the prediction block 2001 that is co-located in the same position with the other picture in the temporal direction.

An encoder determines the position (i.e., coordinate or displacement) of the vertex of the polygon unit within the prediction block 2001 that is co-located with the picture previously decoded as the prediction value. And, the encoder transmits the residual value between the determined prediction value and the vertex position of the polygon unit within the current process block to a decoder.

Here, since the residual value is determined from the prediction block that is co-located with the other picture, the residual value for the vertex of the left side/right side means the difference value in a vertical axis and the residual value for the vertex of the upper side/bottom side means the difference value in a horizontal axis. And the residual value for the vertex of the polygon unit within the process block means the difference value in the vertical axis and the horizontal axis.

In this case, in order for the decoder to distinguish the pictures that include the prediction block 2001, the picture index (e.g., POC) is required to distinguish the information in a temporal direction (i.e., prediction direction) for the picture used for a prediction and the prediction block 2001. Accordingly, the encoder transmits the picture index (e.g., POC) that includes the prediction block 2001 and the prediction direction information to the decoder.

The decoder receives the residual value Δ between the vertex position of the polygon unit within the current process block 2002 and the prediction value for it, the picture index that includes the prediction block 2001 and the prediction direction information. And, the decoder determines the polygon unit vertex position information co-located within the prediction block 2001 as the prediction value using the picture index and the prediction direction information. And, the decoder derives the position of the vertex of the polygon unit of the current process block 2002 based on the received residual value Δ and the determined prediction value.

As such, the decoder may derive the partition structure of the polygon unit within the current process block by deriving the position information of the vertexes of all polygon units within the current process block.

Meanwhile, when satisfying the condition (i.e., the condition under a predetermined threshold value) that the motion vector value is close to zero for each of the polygon units within the current process block, the prediction in the temporal direction as above may be used for predicting the vertex of the polygon unit of the current process block.

Table 11 exemplifies the decoding syntax for a prediction process of a polygon unit partition structure.

TABLE 11

| | Descriptor |
|---|---|
| if (cu_polygon_flag) { | |
| ...... | |
|   if(derive_polygon_partition_info_from_collocated_cu) | |
|   { | |
|     center_pos_x_pred = collocated_center_pos_x | |
|     center_pos_y_pred = collocated_center_pos_y | |
|     upper_pos_x_pred = collocated_upper_pos_x | |
|     right_pos_y_pred = collocated_right_pos_y | |
|     down_pos_x_pred = collocated_down_pos_x | |
|     left_pox_y_pred = collocated_left_pos_y | |
|     if(merge_flag[ x0 ][ y0 ]) { | |
|       center_pos_x_off = 0 | |
|       center_pos_y_off = 0 | |
|       upper_pos_x_off = 0 | |
|       right_pos_y_off = 0 | |
|       down_pos_x_off = 0 | |
|       left_pox_y_off = 0 | |
|     } else { | |
|       center_pos_x_off | ae(v) |
|       center_pos_y_off | ae(v) |
|       upper_pos_x_off | ae(v) |
|       right_pos_y_off | ae(v) |
|       down_pos_x_off | ae(v) |
|       left_pox_y_off | ae(v) |
|     } | |
|     center_pos_x = center_pos_x_pred + center_pos_x_off | |
|     center_pos_y = center_pos_y_pred + center_pos_y_off | |
|     upper_pos_x = upper_pos_x_pred + upper_pos_x_off | |
|     right_pos_y = right_pos_y_pred + right_pos_y_off | |
|     down_pos_x = down_pos_x_pred + right_pos_y_off | |
|     left_pox_y = left_pox_y_pred + left_pox_y_off | |
|   } else { | |
|   ... | |
|   } | |
| ...... | |

In FIG. 11, each of 'center_pos_x_pred' and 'center_pos_y_pred' represents a prediction value of the horizontal direction and the vertical direction respectively for the polygon vertex that is determined in the current CU (that is, the process block). In the same manner, each of the 'upper_pos_x_pred' and 'down_pos_x_pred' represents a prediction value of the horizontal direction for the polygon vertexes that are determined in the upper side and the bottom side of the current CU, and each of the 'right_pos_y_pred' and 'left_pox_y_pred' represents a prediction value of the vertical direction for the polygon vertexes that are determined in the upper side and the bottom side of the current CU.

And, each of the 'collocated_center_pos_x' and 'collocated_center_pos_y' represents a position of the horizontal direction and the vertical direction (i.e., coordinate or displacement) of the polygon vertexes that are determined in inside of the prediction CU, respectively. Likewise, each of the 'collocated_upper_pos_x' and 'collocated_down_pos_x' represents a position of the horizontal direction (i.e., coordinate or displacement) of the polygon vertexes that are determined in the upper side and the bottom side of the prediction CU respectively, and each of the 'collocated_right_pos_y', 'collocated_left_pos_y' represents a position of the horizontal direction (i.e., coordinate or displacement) of the polygon vertexes that are determined in the right side and the left side of the forecasting CU respectively.

Each of the 'center_pos_x_off' and 'center_pos_y_off' represents a residual value of the horizontal and vertical direction between the polygon vertexes inside of the current CU and the prediction CU respectively. Similarly, each of the 'upper_pos_x_off and' down_pos_x_off represents a residual value of the horizontal direction between the polygon vertexes of the upper side and the bottom side inside of the current CU and the prediction CU respectively, and each of the 'right_pos_y_off' and 'left_pox_y_off' represents a residual value of the vertical direction between the polygon vertexes of the right side and the left side inside of the current CU and the prediction CU, respectively.

'derive_polygon_partition_info_from_collocated_cu' indicates whether to use the information of the polygon partition of the prediction CU co-located with the temporal direction as a prediction value (predictor). When the co-located prediction CU is coated in a polygon mode, 'derive_polygon_partition_info_from_collocated_cu' may be set to 1. When 'derive_polygon_partition_info_from_collocated_cu' is set to 1, the polygon vertex position of the prediction CU is determined as a prediction value (predictor) for the polygon vertex of the current CU.

'merge_flag[x0][y0]' is a flag that indicates a merge mode, and an offset value (i.e., a residual value) for the vertex position of the polygon unit is set to be different depending on the flag value. When 'merge_flag[x0][y0]' is '1', the offset value is allocated for each of the positions of the polygon vertexes, otherwise, the offset value is separately allocated for each of the positions of the corresponding polygon vertexes. That is, the position offset value (i.e., a residual value) is transmitted from an encoder to a decoder for each of the vertexes of the polygon unit.

And, the final position of the polygon vertex of the current CU is decoded by adding a prediction value (predictor) and an offset value.

On the other hand, when 'derive_polygon_partition_info_from_collocated_cu' is '0', another prediction method is used, or a prediction is not applied.

In addition, a motion vector (MV) of the polygon unit of the current process block may be predicted from an adjacent process block (or polygon unit) that has been previously decoded or a prediction block (or polygon unit) of another picture.

FIG. 21 is a diagram illustrating a decoding method based on a polygon unit according to an embodiment of the present invention.

Referring to FIG. 21, a decoder receives a MV residual value for the polygon unit of the current process block from an encoder (step, S2101).

Herein, the MV residual value of the polygon unit of the process block that is currently to be decoded, means a difference value between a prediction value (predictor) determined from an adjacent process block (or polygon unit) that has been previously decoded or a prediction block (or polygon unit) of another picture, and a motion vector of the polygon unit of the current process block.

Further details will be described below for the MV residual value of the polygon unit of the process block that is currently to be decoded.

A decoder determines a MV prediction value (predictor) of the polygon unit of the process block that is currently decoded (step, S2102).

Herein, the MV prediction value of the polygon unit of the process block that is currently to be decoded may be determined from an adjacent process block (or polygon unit) that has been previously decoded or a prediction block (or polygon unit) of another picture.

Additionally, an MV prediction value of the polygon unit of the process block that is currently to be decoded may be determined by a unit of the polygon unit or by a unit of the process block.

Further details will be described below for the MV prediction value of the polygon unit of the process block that is currently to be decoded.

Based on an MV residual value and a prediction value of the polygon unit of the process block that is currently to be decoded, a motion vector for the polygon unit of the process block that is currently to be decoded is derived (step, S2103).

As such, by drawing the motion vector for the polygon unit of the process block that is currently to be decoded, the decoder may decode the process block by a unit of the polygon unit.

Referring to FIG. 20 again, in order to determine a motion vector for each of the polygon unit within the current process block 2002, the motion vector for the prediction block 2001 co-located with another picture may be used as a prediction value.

An encoder determines the motion vector of each polygon unit of the prediction block 2001 co-located with the picture that has been previously decoded as a prediction value. And, the encoder transmits a residual value Δ between the prediction value determined and the motion vector of the polygon unit within the current process block to the decoder.

Herein, the residual value Δ for the motion vector means a two-dimensional difference value of the vertical and horizontal directions.

In addition, the encoder transmits the picture index (e.g., POC) that includes the prediction block 2001 and the information of the temporal direction (i.e., a prediction direction) of the picture that is used for the prediction to the decoder.

The decoder receives the residual value Δ between the motion vector of the polygon unit within the current process block 2002 and the prediction value for it, the picture index that includes the prediction block 2001 and the prediction direction information. And, the decoder determines the motion vector for the polygon unit co-located within the prediction block 2001 as the prediction value using the picture index and the prediction direction information. And, the decoder derives the motion vector of the polygon unit of the current process block 2002 based on the received MV residual value Δ and the determined MV prediction value.

As such, the decoder may decode the current process block by a unit of the polygon unit by deriving the motion vector of all polygon units within the current process block.

Table 12 exemplifies the decoding syntax for a motion vector prediction process of a polygon unit.

TABLE 12

| | Descriptor |
|---|---|
| if (cu_polygon_flag) { <br> ...... <br>   if(derive_polygon_motion_info_from_collocated_cu) { <br>     for(i = 0;i < 8;i++) { <br>       polygon_mv_x_pred[ i ] = <br>       collocated_polygon_mv_x[ i ] <br>       polygon_mv_y_pred[ i ] = <br>       collocated_polygon_mv_y[ i ] <br>     } <br>     if(merge_flag[ x0 ][ y0 ]) { <br>       for(i = 0;i < 8;i++) { <br>         polygon_mv_x_off[ i ] = 0 <br>         polygon_mv_y_off[ i ] = 0 <br>       } <br>     } else { <br>       for(i = 0;i < 8;i++) { <br>         polygon_mv_x_off[ i ] <br>         polygon_mv_y_off[ i ] <br>       } <br>     } <br>     for(i = 0;i < 8;i++) { <br>       polygon_mv_x[ i ] = polygon_mv_x_pred[ i ] + polygon_mv_x_off[ i ] <br>       polygon_mv_y[ i ] = polygon_mv_y_pred[ i ] + polygon_mv_y_off[ i ] <br>     } <br>   } else { <br>     ... <br>   } <br> ...... | <br><br><br><br><br><br><br><br><br><br><br><br><br><br>ae(v)<br>ae(v) |

In Table. 12, 'polygon_mv_x_pred[i]' and 'polygon_mv_y_pred[i]' represent a MV prediction value for each of the polygon units of the current CU (i.e., the process block). And, 'collocated_polygon_mv_x[i]' and 'collocated_polygon_mv_y[i]' represent a MV prediction value for each polygon units of the prediction CU co-located with the current CU. And, 'polygon_mv_x_off[i]' and 'polygon_mv_y_off[i]' represent a MV residual value of the polygon unit of the current CU and the polygon unit of the prediction CU. Additionally, 'polygon_mv_x[i]' and 'polygon_mv_y[i]' represent a motion vector value for each of the polygon units of the current CU.

'derive_polygon_motion_info_from_collocated_cu' indicates whether to use the MV value of the prediction CU co-located with the temporal direction. When the co-located prediction CU is coated in a polygon mode, 'derive_polygon_motion_info_from_collocated_cu' may be set to 1.

Similar to the prediction of the polygon unit partition structure, 'merge_flag[x0][y0]' is a flag that indicates a merge mode, and an offset value (i.e., a residual value) for the motion vector of the polygon unit is set to be different depending on the flag value. When 'merge_flag[x0][y0]' is '1', the offset value is allocated to be zero for each of the polygon units, otherwise, the offset value is separately allocated for each of the corresponding polygons. In this case, the MV offset value (i.e., a residual value) for each of the polygon units is transmitted from an encoder to a decoder.

In Table 12, by assuming that eight polygon units (R1~R8) are constructed to maximum for a single CU, for loop made up of eight repetition is performed. However, this is just an example, a single CU may include the fewer number of polygon units when adjacent polygon units are merged, as exemplified in FIG. 8 above. In this case, for loop may be performed, that is repeated as many as the number of polygon units that construct the corresponding CU.

In the example of FIG. 20 above, the motion vector is predicted for each polygon unit. However, in order to predict the motion vector for each polygon unit, the polygon unit of the same shape is required for the picture that is previously decoded for predicting the prediction value.

However, as exemplified by FIG. 12 and FIG. 13 above, when a regular shape of polygon unit partition type is predetermined, it may be easy to find the polygon unit of the same shape in the other picture temporally, but when each of the vertexes of the polygon unit is changeably determined as shown in FIG. 5 to FIG. 12, it may be difficult to find the polygon unit of the same shape in the other picture temporally.

Accordingly, the motion vector may be predicted by a unit of the process block, and this will be described by reference to the following drawing.

FIG. 22 is a diagram illustrating a prediction method of a motion vector of a polygon unit according to an embodiment of the present invention.

In FIG. 22, it is assumed that the picture including a current process block 2202 is picture order count (POC) 2, and the picture including a prediction block 2201 is POC 1.

Referring to FIG. 22, in order to determine the motion vector for the current process block 2202, the motion vector value for the prediction block 2201 in a temporal direction may be utilized for the prediction.

An encoder determines the prediction block 2201 of which rate-distortion cost has the minimum value among the candidate blocks that are available for the inter-prediction. And, an amount of displacement of the position of the prediction block 2201, that is, a motion vector value is determined based on the position of the current process block 2202. That is, the motion vector prediction value that is applied to each polygon unit in the current process block 2202 corresponds to the motion vector value that is determined by a unit of the current process block 2202. In other words, the motion vector of the process block corresponds to the motion vector prediction value in an aspect of each polygon unit. Accordingly, hereinafter, the motion vector of the process block is referred to as the motion vector prediction value.

And, the encoder transmits the residual value Δ between the determined motion vector prediction value and the motion vector value for each polygon unit in the current process block to a decoder. In addition, the encoder transmits the picture index (e.g., POC) including the prediction block 2201 and the information in a temporal direction (i.e., prediction direction) for the picture that is used for the prediction to the decoder.

The decoder receives the residual value Δ between the motion vector prediction value and the motion vector value for each polygon unit in the current process block, the picture index including the prediction block 2201, and the prediction direction. And, the decoder determines the prediction block 2201 of which rate-distortion cost has the minimum value among the candidate blocks that are available for the inter-prediction by using the picture index and the prediction direction, and determines the amount of displacement (i.e., difference value) of the position of the prediction block 2201 as the motion vector prediction value based on the position of the current process block 2202. And, the decoder derives the motion vector value for each polygon unit of the current process block 2202 based on the received motion vector residual value Δ for each polygon unit and the determined prediction value.

And, the decoder decodes the current process block in a unit of polygon unit by deriving the motion vectors of all polygon units within the current process block.

As such, when the motion vector value is identically used as the motion vector prediction value for the polygon unit in a unit of the process block, a single motion vector prediction value is enough per a single process block, thereby the bit for indicating the motion vector prediction value being saved.

In addition, the polygon unit partition structure of the current process block is not dependent on the polygon unit partition structure of the prediction block. That is, the polygon unit partition structure of the current process block may be independently determined according to the method described above regardless of the prediction block.

Table 13 exemplifies the decoding syntax for a motion vector prediction process of a polygon unit.

TABLE 13

|  | Descriptor |
|---|---|
| if (cu_polygon_flag) { | |
| ...... | |
|   cu_polygon_mv_x | ae(v) |
|   cu_polygon_mv_y | ae(v) |
|   for(i = 0;i < 8;i++) { | |
|     polygon_mv_x_off[ i ] | ae(v) |
|     polygon_mv_y_off[ i ] | ae(v) |
|   } | |
|   for(i = 0;i < 8;i++) { | |
|     polygon_mv_x[ i ] = cu_polygon_mv_x + | |
|     polygon_mv_x_off[ i ] | |
|     polygon_mv_y[ i ] = cu_polygon_mv_y + | |
|     polygon_mv_y_off[ i ] | |
|   } | |
| ...... | |
| } | |

In Table 13, 'cu_polygon_mv_x[i]' and 'cu_polygon_mv_y[i]' mean the motion vectors for all CU (i.e., process block). That is, as described above, the motion vector of the process block corresponds to the motion vector prediction value for each polygon unit.

And, 'polygon_mv_x_off[i]' and 'polygon_mv_y_off[i]' represent the residual value Δ between the motion vector prediction value and the motion vector values for each polygon unit in the current CU.

'cu_polygon_mv_x[i]' and 'cu_polygon_mv_y[i]' represent the motion vector values for each polygon unit within the current CU.

The motion vector values for each polygon unit within the current CU is derived by summing a single prediction value (i.e., 'cu_polygon_mv_x[i]' and 'cu_polygon_mv_y[i]') and the residual value (i.e., 'polygon_mv_x_off[i]' and 'polygon_mv_y_off[i]') for each of the corresponding polygon unit.

In Table 13, by assuming that eight polygon units (R1~R8) are constructed to maximum for a single CU, for loop made up of eight repetition is performed. However, this is just an example, a single CU may include the fewer number of polygon units when adjacent polygon units are merged, as exemplified in FIG. 8 above. In this case, for loop may be performed, that is repeated as many as the number of polygon units that construct the corresponding CU.

In the embodiment described above, the motion vector prediction value for the polygon unit is determined in the same way in a unit of process block, but the motion vector prediction value may be independently determined for each polygon unit in the process block. This will be described by reference to the following drawing.

FIG. 23 is a diagram illustrating a prediction method of a motion vector of a polygon unit according to an embodiment of the present invention.

In order to predict the motion vector for each polygon unit within a current process block, the motion vector of an adjacent polygon unit that is already coded is used. Herein, the polygon unit that is already coded may be included in the current process block, or included in the process block adjacent to the current process block.

First, when a side of the polygon unit contacts (or overlaps) the left or upper side of the current process block, in order to derive the motion vector of the corresponding polygon unit, the motion vector of the polygon unit within the adjacent process block may be used as a prediction value.

And, any one side of the polygon unit does not contact (or overlap) the left or upper side of the current process block, in order to derive the motion vector of the corresponding polygon unit, the motion vector of the adjacent polygon unit within the current process block may be used as a prediction value.

Referring to FIG. 23, for the polygon units 2302, 2303, 2304 and 2305 that contact the left side (or upper side) of the process block among the polygon units within the current process block, an encoder determines the motion vector value of the adjacent polygon unit within the process block adjacent to the left side (or upper side) as a prediction value. For example, the motion vector value of the adjacent polygon unit 2301 within the adjacent process block may be determined to be the motion vector prediction value for the polygon unit 2302.

In addition, for the polygon units 2306, 2307, 2308 and 2309 that do not contact the left side (or upper side) of the process block among the polygon units within the current process block, the encoder determines the motion vector value of the adjacent polygon unit within the process block adjacent as a prediction value.

Further, when there is the adjacent polygon unit which is already coded within the current process block according to a coding order among the polygon units 2302, 2303, 2304 and 2305 that contact the left or upper side of the process block, the motion vector of the adjacent polygon unit within the current process block may be used as a prediction value. Likewise, when there is the adjacent polygon unit which is already coded according to a coding order among the remaining polygon units 2306, 2307, 2308 and 2309 that do not contact the left or upper side of the process block, the motion vector of the adjacent polygon unit may be used as a prediction value.

For example, assuming the case that the polygon unit 2302 is coded after the polygon unit 2304 is coded, in order to derive the motion vector prediction value of the polygon unit 2302, the motion vector of the polygon unit 2301 within the adjacent process block or the polygon unit 2304 within the current process block may be used.

That is, the encoder configures the motion vectors of the adjacent polygon unit within the adjacent process block for each polygon unit or within the current process block as prediction candidates, and by selecting one among these, derives the motion vector prediction value. In addition, the prediction candidates may also be generated again from the process blocks that are collocated in the same position within a picture.

As such, when there is a plurality of prediction candidates that are available since there is a plurality of polygon units adjacent to the polygon unit, the motion vector for the polygon unit adjacent to the longest side of the current polygon unit may be selected as the prediction value. That is, in the above example, the polygon unit 2302 may use both of the motion vector of the polygon unit 2301 within the adjacent process block and the motion vector of the polygon unit 2304 within the current process block, but may select the motion vector of the polygon unit 2304 adjacent to the longest side of the current polygon unit 2302 as the prediction value.

And, the encoder transmits the residual value Δ between the determined motion vector prediction value and the motion vector of the polygon unit within the current process block, and the index of the polygon unit that is selected to derive the motion vector prediction value to the decoder.

The decoder receives the residual value Δ between the motion vector and the motion vector prediction value for each polygon unit within the current process block, and the index of the polygon unit that is selected to derive the motion vector prediction value from the encoder. And, using the index of the polygon unit, the decoder determines the motion vector of the polygon unit that is indicated by the corresponding index as the motion vector prediction value. And, the decoder derives the motion vector for each polygon unit of the current process block based on the received motion vector residual value Δ and the determined motion vector prediction value.

Table 14 exemplifies the decoding syntax for a motion vector prediction process of a polygon unit.

TABLE 14

|  | Descriptor |
|---|---|
| if (cu_polygon_flag) {<br>  ......<br>  for(i = 0;i < 8;i++) {<br>    polygon_mv_cand_idx[ i ]<br>  }<br>  if(merge_flag[ x0 ][ y0 ]) {<br>    for(i = 0;i < 8;i++) {<br>      polygon_mv_x_off[ i ] = 0<br>      polygon_mv_y_off[ i ] = 0<br>    }<br>  } else {<br>    for(i = 0;i < 8;i++) {<br>      polygon_mv_x_off[ i ]<br>      polygon_mv_y_off[ i ]<br>    }<br>  }<br>} | ae(v)<br><br><br><br><br><br><br><br><br><br>ae(v)<br>ae(v) |

TABLE 14-continued

| | Descriptor |
|---|---|
| ```
for(i = 0;i < 8;i++) {
    polygon_mv_x[ i ] = polygon_mv_x_cancl[
polygon_mv_cand_idx[ i ]] + polygon_mv_x_off[ i ]
    polygon_mv_y[ i ] = polygon_mv_y_cand[
polygon_mv_cand_idx[ i ]] + polygon_mv_y_off[ i ]
  }
  ......
}
``` | |

In Table 14, 'polygon_mv_cand_idx[i]' represents the index of the polygon unit that is selected to determine the motion vector prediction value for each polygon unit within a CU (i.e., process block). And, 'polygon_mv_x_cand[ ]' and 'polygon_mv_y_cand[ ]' represent the motion vector prediction values for each polygon unit within the current CU.

'polygon_mv_x_off[i]' and 'polygon_mv_y_off[i]' represent the residual values Δ between the motion vector for each polygon unit within the current CU and the motion vector prediction value.

And, 'polygon_mv_x[I]' and 'polygon_mv_y[i]' represent the motion vector values for each polygon unit within the current CU.

When 'merge_flag[x0][y0]' is '1', the motion vector residual values of all polygon units are set to 0, and when 'merge_flag[x0][y0]' is '0', the motion vector residual value is configured for each polygon unit. That is, the encoder transmits the motion vector residual value to the decoder for each polygon unit.

The motion vector values for each polygon unit within the current CU is derived by summing the motion vector prediction value (i.e., 'polygon_mv_x_cand[ ]' and 'polygon_mv_y_cand[ ]') for the corresponding polygon unit and the residual value (i.e., 'polygon_mv_x_off[i]' and 'polygon_mv_y_off[i]').

In Table 14, by assuming that eight polygon units (R1~R8) are constructed to maximum for a single CU, for loop made up of eight repetition is performed. However, this is just an example, a single CU may include the fewer number of polygon units when adjacent polygon units are merged, as exemplified in FIG. 8 above. In this case, for loop may be performed, that is repeated as many as the number of polygon units that construct the corresponding CU.

FIG. 24 illustrates a schematic inner block diagram of a polygon unit prediction unit that performs a prediction for a polygon unit according to an embodiment of the present invention.

Referring to FIG. 24, a polygon unit prediction unit 2400 implements the function, process and/or method proposed in FIG. 15 to FIG. 23 above. Particularly, the polygon unit prediction unit 2400 may include a residual value reception unit 2401, a prediction value determination unit 2402 and a derivation unit 2403. Herein, the residual value reception unit 2401 and the derivation unit 2403 may correspond to the add unit 235 in FIG. 2, and the prediction value determination unit 2402 may correspond to the prediction unit 260.

The residual value reception unit 2401 receives the vertex of the polygon unit of the process block that is currently to be decoded or the residual value for a motion vector.

The prediction value determination unit 2402 determines the prediction value for the vertex of the polygon unit of the process block that is currently to be decoded or the motion vector prediction value. The prediction value determination unit 2402 may determine the prediction value for the vertex of the polygon unit of the process block that is currently to be decoded or the motion vector prediction value from an adjacent process block that is previously decoded or the other picture in a temporal direction.

The derivation unit 2403 may derive the vertex position of the polygon unit of the process block that is currently to be decoded based on the residual value and the prediction value for the vertex of the polygon unit of the process block that is currently to be decoded. In addition, the derivation unit 2403 may derive the motion vector of the polygon unit of the process block that is currently to be decoded based on the motion vector residual value and the motion vector prediction value of the polygon unit of process block that is currently to be decoded.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

So far, the preferred embodiments of the present invention described above are disclosed as examples, and may be modified, changed, substituted or added by other various embodiments within the inventive concept and scope of the present invention described in the enclosed claims below by those skilled person in the art.

The invention claimed is:

1. A method for decoding an image based on a polygon unit, comprising:
   receiving a residual value for a vertex of the polygon unit that is partitioned from a first block that constructs an image;
   determining a prediction value for the vertex of the polygon unit using a position of a partition point that is located in a side of a second block adjacent to the first block or a center point of the first block;
   deriving a position of the vertex of the polygon unit based on the residual value for the vertex and the prediction value for the vertex;
   determining a motion vector for the first block using a motion vector value for a third block in a temporal direction; and
   decoding the image in units of the polygon unit,
   wherein the step of decoding in units of the polygon unit further comprises:
   receiving a motion vector residual value for the polygon unit determining a motion vector prediction value for the polygon unit using the motion vector for the first block; and
   deriving a motion vector for the polygon unit based on the residual value for the polygon unit and the prediction value for the polygon unit.

2. The method of claim 1, wherein the step of determining the prediction value for the vertex of the polygon unit further comprises:
   determining a prediction value for a vertex located on a left side of the first block using a position of a partition point located on a right side of a fourth block adjacent to the left side of the first block;
   determining a prediction value for a vertex located on an upper side of the first block using a position of a partition point located on a bottom side of a fifth block adjacent to the upper side of the first block; and
   determining a prediction value for vertexes located on right and lower sides of the first block using a position of the center point of the first block.

3. The method of claim 1, wherein the prediction value for the vertex is determined to be a point among the partition points that are located in the side of the second block, when a number of polygon vertexes located in the side of the second block is more than a number of the partition points located in the side of the first block.

4. The method of claim 1, wherein the prediction value for the vertex is determined to be an average value or a median value of a displacement value from a center point of the partition point located in the side of the second block, when a number of polygon vertexes located in the side of the second block is more than a number of the partition points located in the side of the first block.

5. The method of claim 1, wherein the prediction value for the vertex is determined to be a position of the partition point located within a range in which the vertex of the polygon unit is available to be located, when a number of polygon vertexes located in the side of the first block is more than a number of polygon vertexes in the side of the second block.

6. The method of claim 1, wherein the second block is partitioned in a unit of polygon unit or in a Quad-tree structure.

7. The method of claim 1, wherein the prediction value for the vertex is determined to be a position of a vertex of a polygon unit in the third block that is collocated with the first block.

* * * * *